(12) United States Patent
Yasuhara et al.

(10) Patent No.: US 7,557,483 B2
(45) Date of Patent: Jul. 7, 2009

(54) ROTATING ELECTRICAL MACHINE AND MANUFACTURING METHOD THEREOF

(75) Inventors: Takashi Yasuhara, Yotsukaido (JP); Takayuki Koizumi, Hitachinaka (JP); Ryozo Takeuchi, Hitachi (JP); Koji Obata, Hitachi (JP); Hidemitsu Kobayashi, Naka (JP)

(73) Assignee: Hitachi, Ltd., Tokyo (JP)

( * ) Notice: Subject to any disclaimer, the term of this patent is extended or adjusted under 35 U.S.C. 154(b) by 330 days.

(21) Appl. No.: 11/298,508

(22) Filed: Dec. 12, 2005

(65) Prior Publication Data

US 2006/0152188 A1 Jul. 13, 2006

Related U.S. Application Data

(63) Continuation-in-part of application No. 11/259,032, filed on Oct. 27, 2005, now abandoned.

(30) Foreign Application Priority Data

| Oct. 29, 2004 | (JP) | ............................. 2004-315710 |
| Mar. 31, 2005 | (JP) | ............................. 2005-101382 |
| Jun. 17, 2005 | (JP) | ............................. 2005-177117 |

(51) Int. Cl.
  *H02K 3/12* (2006.01)
(52) U.S. Cl. ........................ 310/184; 310/198; 310/208
(58) Field of Classification Search ................ 310/179, 310/180, 208, 184, 198, 206–207
  See application file for complete search history.

(56) References Cited

U.S. PATENT DOCUMENTS

| 6,515,394 | B2 * | 2/2003 | Ueda et al. .................. 310/208 |
| 6,967,421 | B2 * | 11/2005 | Gomyo et al. ............... 310/180 |
| 7,009,320 | B2 * | 3/2006 | Akita et al. .................. 310/179 |
| 7,091,645 | B2 * | 8/2006 | Yoneda et al. ............... 310/208 |
| 7,126,246 | B2 * | 10/2006 | Izumi et al. .................. 310/208 |
| 2004/0207501 | A1 * | 10/2004 | Souki et al. .................. 336/180 |

FOREIGN PATENT DOCUMENTS

| GB | 456206 | 11/1936 |
| GB | 1126073 | 9/1968 |
| JP | 50-301 | 1/1975 |
| JP | 3-46515 A | 2/1991 |
| JP | 2002-51489 | 2/2002 |

OTHER PUBLICATIONS

European Search Report dated Apr. 25, 2007 (Five (5) pages).
"Institute of Electrical Engineers of Japan Technical Report", Aug. 1999, pp. 14-20, vol. 729.

(Continued)

*Primary Examiner*—Tran N Nguyen
(74) *Attorney, Agent, or Firm*—Crowell & Moring LLP

(57) ABSTRACT

A stator coil is configured of a first group of six turns of conductive wire, and a second group also of six turns, with the first group of six turns being wound on a spool, leaving a gap the same as the diameter of the conductive wire between winds. Upon completion of winding the first group, the winding is turned back, and the second group of six turns is wound in the gap, so as to be adjacent to the turns of the first group. The article is then inserted into a slot in a stator core of a stator, thereby configuring a stator coil. This provides for a rotating electrical machine and manufacturing method thereof with improved insulation resistivity regarding inverter surge voltage, and moreover high output can be obtained with a machine of comparable external dimensions with conventional machines.

9 Claims, 32 Drawing Sheets

OTHER PUBLICATIONS

Kazuyoshi Hitosugi et al., "Measured Characteristics of Induction Motor with Reduced Turns of Terminal Coils", Institute of Electrical Engineers of Japan Rotating Machine Study Team Material, Oct. 18, 2000, pp. 19-23, RM-00-95.

Masayuki Ieda et al., "Modern High-Voltage Engineering (Gendai Koden'atsu Kogaku)", pp. 91-93, Ohmsya, Japan, ISBN 4-274-12741-9.

* cited by examiner

FIG. 21A
FIG. 21B
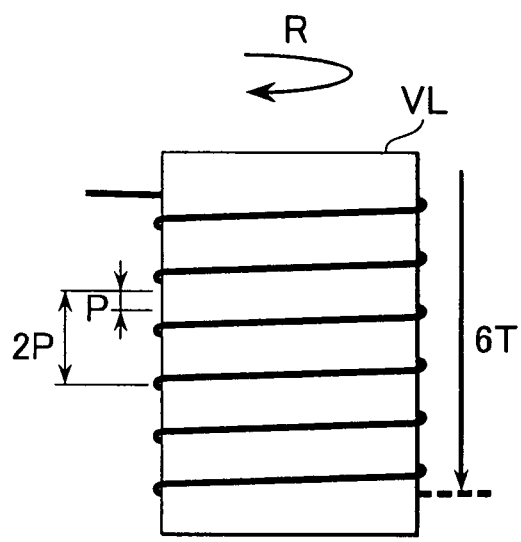
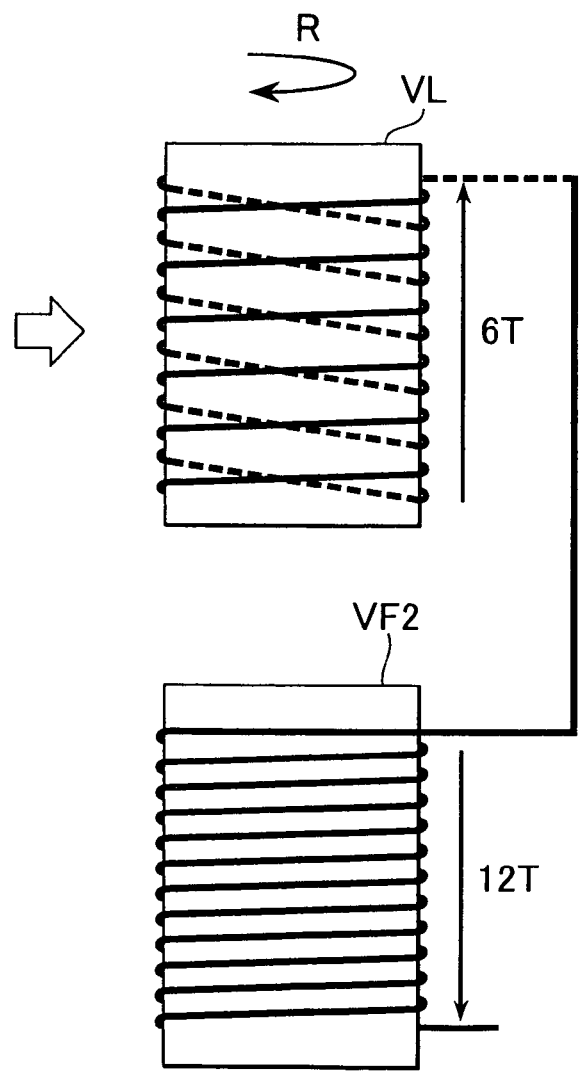

CROSS-SECTION A-A'

CROSS-SECTION D-D'

ROTATING ELECTRICAL MACHINE AND MANUFACTURING METHOD THEREOF

CROSS-REFERENCE TO RELATED APPLICATIONS

This application is a Continuation-In-Part of U.S. application Ser. No. 11/259,032, filed Oct. 27, 2005, and claims the priority of Japanese Application No. 2005-101382, filed Mar. 31, 2005; Japanese Application No. 2004-315710, filed Oct. 29, 2004; and Japanese Application No. 2005-177117, filed Jun. 17, 2005, which are hereby incorporated by reference.

BACKGROUND OF THE INVENTION

1. Field of the Invention

The present invention relates to a rotating electrical machine and a manufacturing method thereof.

2. Description of the Related Art

In recent years, operating rotating electrical machines at variable speeds using an inverter device has become widespread, from the perspective of energy conservation. However, it has been reported that in the event of driving a rotating electrical machine using an inverter device, voltage higher than when driving with conventional commercial frequency power is generated between coils making up the stator coils of the rotating electrical machine, due to steep surge voltage occurring when operating the inverter device (e.g., see Institute of Electrical Engineers of Japan Technical Report vol. 739, pp 14-20). Conventionally, this problem has been handled by reinforcing insulation or improving voltage distribution between coils with regard to the surge voltage.

Of these methods, reinforcing insulation is carried out by reducing the number of winds of the stator coils where the surge voltage from the inverter is applied, and making the insulating covering thicker (e.g., see Institute of Electrical Engineers of Japan Rotating Machine Study Team Material RM-00-95). However, this method changes the machine output properties of the rotating electric machine, and accordingly is limited in its extent.

With the latter method of improving the voltage distribution between coils, study has been carried out regarding high-voltage and steep surge voltage such as lightning impulses and on/off surges of vacuum breakers, in devices such as high-voltage motors, high-voltage generators, and other like high-voltage rotating machines, high-voltage transformers, reactors, and other like high-voltage stationary induction devices, even before surge voltage of inverter devices became problematic. For example, a method has been proposed to analyze voltage distribution between coils by approximating electromagnetic coils with an equivalency circuit formed with inter-coil capacitance and to-ground capacitance of various portions of the coils, and calculating the voltage distribution with regard to unit step voltage (e.g., see Masayuki Ieda "Gendai Koden'atsu Kogaku (Modern High-voltage Engineering)" pp 91-93, published by Ohmsha).

Also, A proposal has been made to design the to-ground capacitance of each the parts of the coils smaller in comparison with the distributed capacitance between coils, thereby reducing the voltage distribution between coils. Further, with regard to high-voltage rotating electrical machines, a proposal has been made for a method to alleviate inter-coil voltage balance by connecting capacitors externally from the coils, for adjusting capacitance distribution between coils (e.g., see JP-A-50-301).

Further, a three-phase distributed winding arrangement is know for conventional rotating electrical machines, as described in JP-A-2002-51489, for example.

SUMMARY OF THE INVENTION

However, with conventional low-voltage rotating electrical machines below 1 kVrms, measures for dealing with voltage balance between coils with regard to steep surge voltage from inverter devices described above had not been taken. This is thought to be due to the fact that generally, the probability of a lighting surge or on/off surge directly entering a low-voltage rotating electrical machine is low, and also that controlling the distributed capacitance between coils and the to-ground distributed capacitance of each of the parts of the coils using rectangular conductors as with high-voltage rotating electrical machines is difficult since low-voltage rotating electrical machines use stator coils made using round wire with enamel coating. Another conceivable reason is that in the event of winding multiple coils at once without cutting the magnet wire, connecting capacitors for adjusting capacitance distribution between coils is difficult.

Also, as for means for gaining high output from a rotating electrical machine, two types can be conceived; great current, and high voltage. However, there is the need to increase the diameter of the stator coil wires in order to use great current, and there is the need to make the stator core slots greater to obtain a predetermined number of turns. Consequently, there is the problem that the size of the rotating electrical machine increases. On the other hand, in the case of high voltage, the voltage applied to the stator coil increases, so the insulation resistivity of the coil needs to be improved. A conceivable example is to make the thickness of the insulating material (enamel or the like) coated on the surface of the conductor which is copper or the like greater so as to improved insulation resistivity. However, in this case, the coil increases in diameter. Consequently, the problem of increased size of the rotating electrical machine arises. Thus, either means have the problem that the rotating electrical machine increases in size due to the change in coil specifications.

The present invention provides for a rotating electrical machine wherein insulation resistivity of the coils as to voltage can be improved without changing the specifications of the coils.

The present invention is formed by multiple winds of conductive wire being wound, and the conductive wire of the coil is mounted in a core such that the combined capacitance of the conductive wires in the coil mounted to the core is greater.

Also, the present invention provides for a manufacturing method of the above-describe rotating electrical machine.

Further, the present invention provides for a rotating electrical machine which can reduce concentration of voltage to the line side unit coils with regard to steep inverter surge voltage, without changing the machine output properties due to reinforcing insulation.

The present invention has multiple unit coils each formed of multiple winds of conductive wire stored in multiple slots of a stator core such that the distance between the winding start of the conductive wire and the winding end of the conductive wire in the slot is in close proximity, preferably, with the diameter of the conductive wire as R, such that the distance between the winding start of the conductive wire and the winding end of the conductive wire in the slot is within 2R.

According to the present invention, the capacitance between conductive wires can be increased. Accordingly, with the present invention, concentration of voltage to the line side unit coils with regard to steep inverter surge voltage can be reduced without changing the machine output properties due to reinforcing insulation.

Further, the present invention provides for a manufacturing method of the rotating electrical machine enabling fabrication of a stator coil capable of reducing concentration of voltage to the line side unit coils with regard to steep inverter surge voltage.

With the present invention, unit coils are manufactured by winding conductive wire on a spool, wherein the conductive wire is wound out and back one time or more from one portion of the spool to another portion of the spool in a reciprocal manner, such that the distance between the winding start of the conductive wire and the winding end of the conductive wire is in close proximity, preferably, with the diameter of the conductive wire as R, such that the distance between the winding start of the conductive wire and the winding end of the conductive wire is within 2R.

According to the present invention, the coil configuration of the above-described rotating electrical machine can be obtained when storing the unit coils fabricated as described above in multiple slots of the stator core. Accordingly, with the present invention, a stator coil can be fabricated which is capable of reducing concentration of voltage to the line side unit coils with regard to steep inverter surge voltage.

Moreover, the present invention provides for a rotating electrical machine capable of reducing voltage occurring at the contact portions between coil end portions of unit coils of the same phase.

The present invention has multiple unit coils each configured by multiple winds of conducting wire, which are connected serially to configure serial circuits, and multiple serial circuits are connected in parallel to configured a coil circuit, and multiple coil circuits are connected to configured a stator coil, wherein the number of unit coils making up one serial circuit is greater than the number of serial circuits connected in parallel making up one coil circuit, and preferable the number of unit coils making up one serial circuit is three or more.

According to the present invention, the voltage of the line side unit coils reduced due to stronger capacity coupling between conductor wires is balanced out between other unit coils as well, enabling more equal voltage balancing between the unit coils. Accordingly, voltage occurring at the contact portions between coil ends of unit coils of the same phase can be reduced.

Thus, according to the present invention, conducting wire of the coil is mounted to the core such that the combined capacitance between conductive wires is great, so the insulation resistivity of the coils as to voltage can be improved without changing the specifications of the coils. Accordingly, with the present invention, high output of the rotating electrical machine can be realized with a size comparable to that of conventional machines. This is particularly suitable for rotating electrical machines driven by inverter devices where excessive surge voltage is applied to the coils from the inverter device.

Also, according to the present invention, a rotating electrical machine can be provided for wherein anti-inverter-surge properties are excellent, since concentration of voltage to the line side unit coils with regard to steep inverter surge voltage can be reduced without changing the machine output properties due to reinforcing insulation.

Also, according to the present invention, a method for manufacturing a rotating electrical machine can be provided for wherein anti-inverter-surge properties are excellent, since stator coils can be fabricated capable of reducing concentration of voltage to the line side unit coils with regard to steep inverter surge voltage.

Moreover, according to the present invention, a rotating electrical machine can be provided for wherein anti-inverter-surge properties are excellent, without introducing insulating sheets between unit coil end portions of unit coils, since voltage occurring at the contact portions between coil ends of unit coils of the same phase can be reduced.

According to a first aspect of the present invention, a rotating electrical machine comprises: a stator wherein each of stator coils for three phases have been wound on salient poles of a stator core by distributed winding; and a rotor on which a plurality of permanent magnets have been distributed at equal intervals in the circumferential direction, the rotor being supported to as to be rotatable facing the stator; wherein the stator coils are formed such that each of the stator coils is divided into N (wherein N=2, 3, or 4) groups in which the number of winds for each group is equal or approximately equal, a winding wire for a first group is wound on a spool leaving a gap of $((N-1) \cdot P)$ with respect to the diameter P of the conducting wire, upon winding of the first group being complete, the winding is turned back so as to wind the winding wire for a second group in the gap, so as to be adjacent to the winding wire of the first group, in the event that N=3 or greater, the next winding wire of the next group is further wound in the gap adjacent to the winding wire of the previous groups, and wound on the spool arrayed in a single layer, following which the wound wires are inserted within a slot of the stator core of the stator, thereby completing a stator coil.

According to a second aspect of the present invention, a rotating electrical machine comprises: a stator; and a rotor borne to as to be rotatable facing the circumferential face of the stator across a gap; the stator having a stator core, and stator coils wound on the stator core by distributed winding, the stator core having a plurality of slots continuous in the axial direction formed in the circumferential direction, and the stator coils being formed such that a stator coil is divided into N (wherein N=2, 3, or 4) groups in which the number of winds for each group is equal or approximately equal, a winding wire for a first group is wound on a spool leaving a gap of $((N-1) \cdot P)$ with respect to the diameter P of the conducting wire, upon winding of the first group being complete, the winding is turned back so as to wind the winding wire for a second group in the gap, so as to be adjacent to the winding wire of the first group, in the event that N=3 or greater, the winding wire of the next group is further wound in the gap adjacent to the winding wire of the previous groups, and wound on the spool arrayed in a single layer, following which the wound wires are inserted within a slot of the stator core of the stator, thereby completing a stator coil.

According to a third aspect of the present invention, a rotating electrical machine comprises: a stator; and a rotor borne to as to be rotatable facing the circumferential face of the stator across a gap; the stator having a stator core, and stator coils wound on the stator core by distributed winding, the stator core having a plurality of slots continuous in the axial direction formed in the circumferential direction, and the stator coils being formed such that a stator coil is divided into N (wherein N=2, 3, or 4) groups in which the number of winds for each group is equal or approximately equal, each coil is wound on a spool in one arrayed layer such that between winds of one group are winds of another group, following which the wound wires are inserted within a slot of the stator core of the stator, thereby completing a stator coil.

According to a fourth aspect of the present invention, with a method for manufacturing a rotating electrical machine comprising: a stator wherein each of stator coils for three phases have been wound on salient poles of a stator core by distributed winding; and a rotor on which a plurality of permanent magnets have been distributed at equal intervals in the circumferential direction, the rotor being supported to as to be rotatable facing the stator; the stator coils are formed such that each of the stator coils is divided into N (wherein N=2, 3, or 4) groups in which the number of winds for each group is equal or approximately equal, an automatic winder is used to wind a winding wire for a first group on a spool leaving a gap of ((N−1)·P) with respect to the diameter P of the conducting wire, upon winding of the first group being complete, the winding is turned back so as to wind the winding wire for a second group in the gap, so as to be adjacent to the winding wire of the first group, in the event that N=3 or greater, the winding wire of the next group is further wound in the gap adjacent to the winding wire of the previous groups, and wound on the spool arrayed in a single layer, following which the wound wires are inserted by an automatic inserter within a slot of the stator core of the stator, thereby winding the stator coil to the stator core.

According to a fifth aspect of the present invention, a rotating electrical machine comprises: a stator; and a rotor borne to as to be rotatable facing the stator across a gap; the stator having a stator core on which are formed a plurality of slots, and stator coils mounted on the stator core, the stator coils having a plurality of unit coils configured of multiple winds of a conducting wire, wherein the unit coils are stored in the plurality of slots such that the distance between the winding start conducting wire and the winding end conducting wire in a slot is in close proximity.

According to a sixth aspect of the present invention, a rotating electrical machine comprises: a stator; and a rotor borne to as to be rotatable facing the stator across a gap; the stator having a stator core on which a plurality of slots are formed, and stator coils mounted on the stator core, the stator core having a plurality of unit coils configured of multiple winds of a conducting wire, wherein, with the diameter of the conducting wire as R, the unit coils are stored in the plurality of slots such that the distance between the winding start conducting wire and the winding end conducting wire in a slot is within 2R.

According to a seventh aspect of the present invention, a manufacturing method for a coil rotating electrical machine, wherein a process for manufacturing unit coils by winding a conducting wire on a spool a plurality of times is repeated to fabricate a plurality of unit coils, the manufactured plurality of unit coils are stored in a plurality of slots of a stator core, the stored plurality of unit coils are connected one to another to configure a stator coil, and the stator having the configured stator coil is assembled into a rotating electrical machine main unit; wherein winding of the conducting wire onto the spool is performed by reciprocally winding at least one time out and back from one part of the spool to another part thereof such that the winding start of the conducting wire and the winding end of the conducting wire are in close proximity.

According to an eighth aspect of the present invention, with a manufacturing method for a rotating electrical machine, a process for manufacturing unit coils by winding a conducting wire on a spool a plurality of times is repeated to fabricate a plurality of unit coils, the manufactured plurality of unit coils are stored in a plurality of slots of a stator core, the stored plurality of unit coils are connected one to another to configure a stator coil, and the stator having the configured stator coil is assembled into a rotating electrical machine main unit; wherein winding of the conducting wire onto the spool is performed by reciprocally winding at least one time out and back from one part of the spool to another part thereof such that, with the diameter of the conducting wire as R, such that the distance between the winding start of the conducting wire and the winding end of the conducting wire is within 2R.

According to a ninth aspect of the present invention, a rotating electrical machine comprises: a stator; and a rotor borne to as to be rotatable facing the stator across a gap; the stator having a stator core in which a plurality of slots are formed, and stator coils mounted on the stator core, the stator coils having a plurality of unit coils configured of multiple winds of a conducting wire, and also a plurality of serial circuits configured of the unit coils are connected in parallel to configure a plurality of coil circuits, which are connected one to another; and wherein the number of the unit coils configuring one of the serial circuits is greater than the number of the serial circuits connected in parallel configuring one of the coil circuits.

BRIEF DESCRIPTION OF THE DRAWINGS

FIGS. 21A and 21B are explanatory diagrams of the winding method for the stator coil of the rotating electrical machine according to a sixth embodiment of the present invention;

DESCRIPTION OF THE PREFERRED EMBODIMENTS

Embodiments of the present invention will now be described with reference to FIGS. 1 through 29.

First Embodiment

First, the configuration of a rotating electric machine according to a first embodiment will be described with reference to FIGS. 1 and 2. The first embodiment will be described regarding an example of a synchronous machine having a rotor with permanent magnets built in, with eight magnetic poles and 48 stator slots, distributed winding having been employed for winding the stator coil. This rotating electric machine is mounted in a hybrid automobile to serve as an automobile-driving rotating electric machine making up the driving source thereof along with an internal combustion engine. The rotating electric machine is driven by an inverter device which converts DC electrical power supplied from a battery, which is the electrical power source of the automobile, into AC electrical power.

With electrically-driven vehicles such as hybrid automobiles or the like, synchronous machines which have a rotor with permanent magnets built in and which are driven by an inverter device are advantageous in the points of high output and field-weakening control. A key technology in obtaining high output power with high voltage with this synchronous machine is improved insulation resistivity of coils with regard to surge voltage generated at the time of DC/AC conversion operations of the inverter device.

Note that the stator configuration described blow is not restricted to the above synchronous machine, and can also be applied to induction machines as well.

Figure 1:
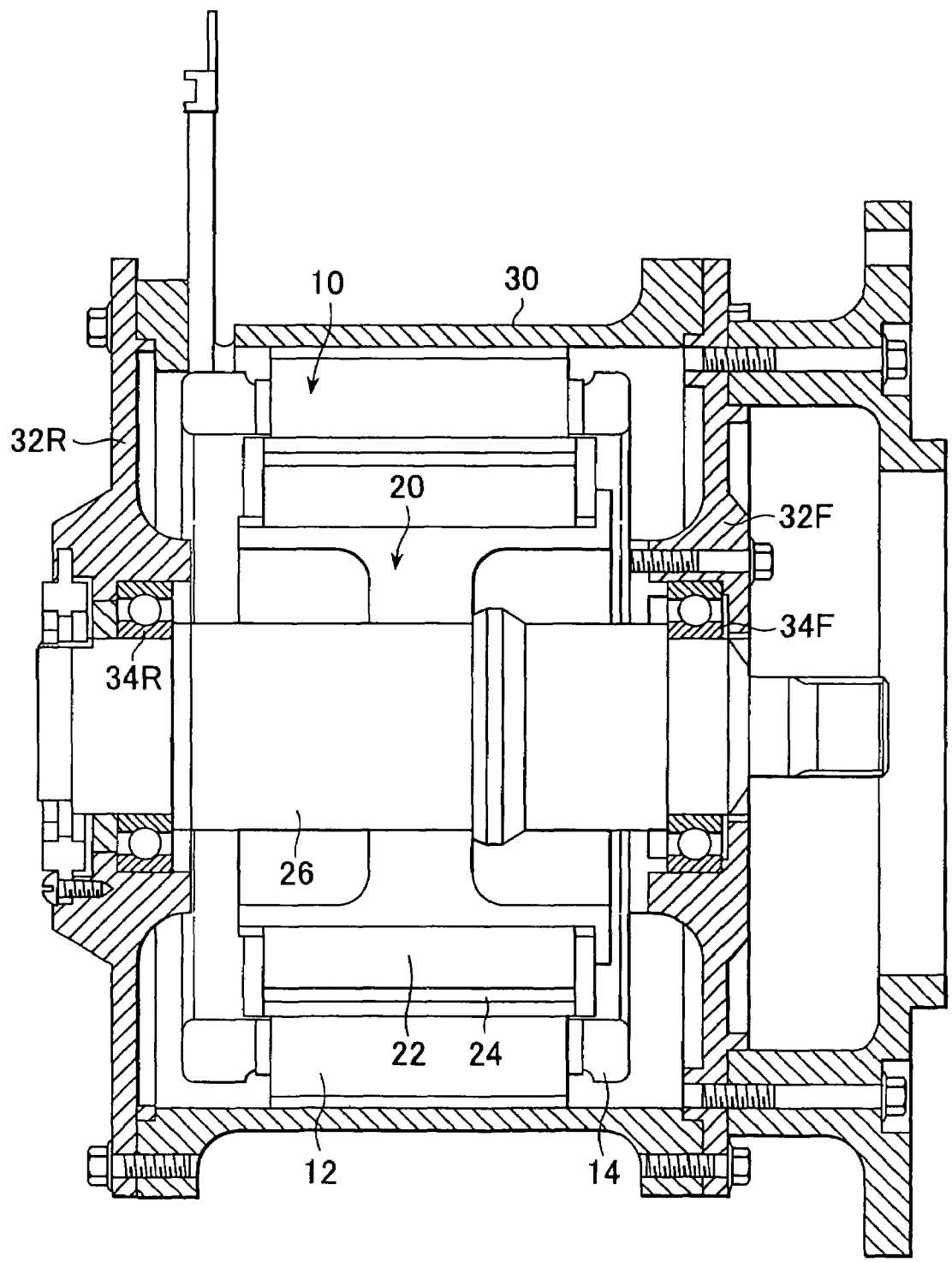
FIG. 1 is a cross-sectional view illustrating the overall configuration of a rotating electrical machine according to a first embodiment of the present invention.
Figure 2:
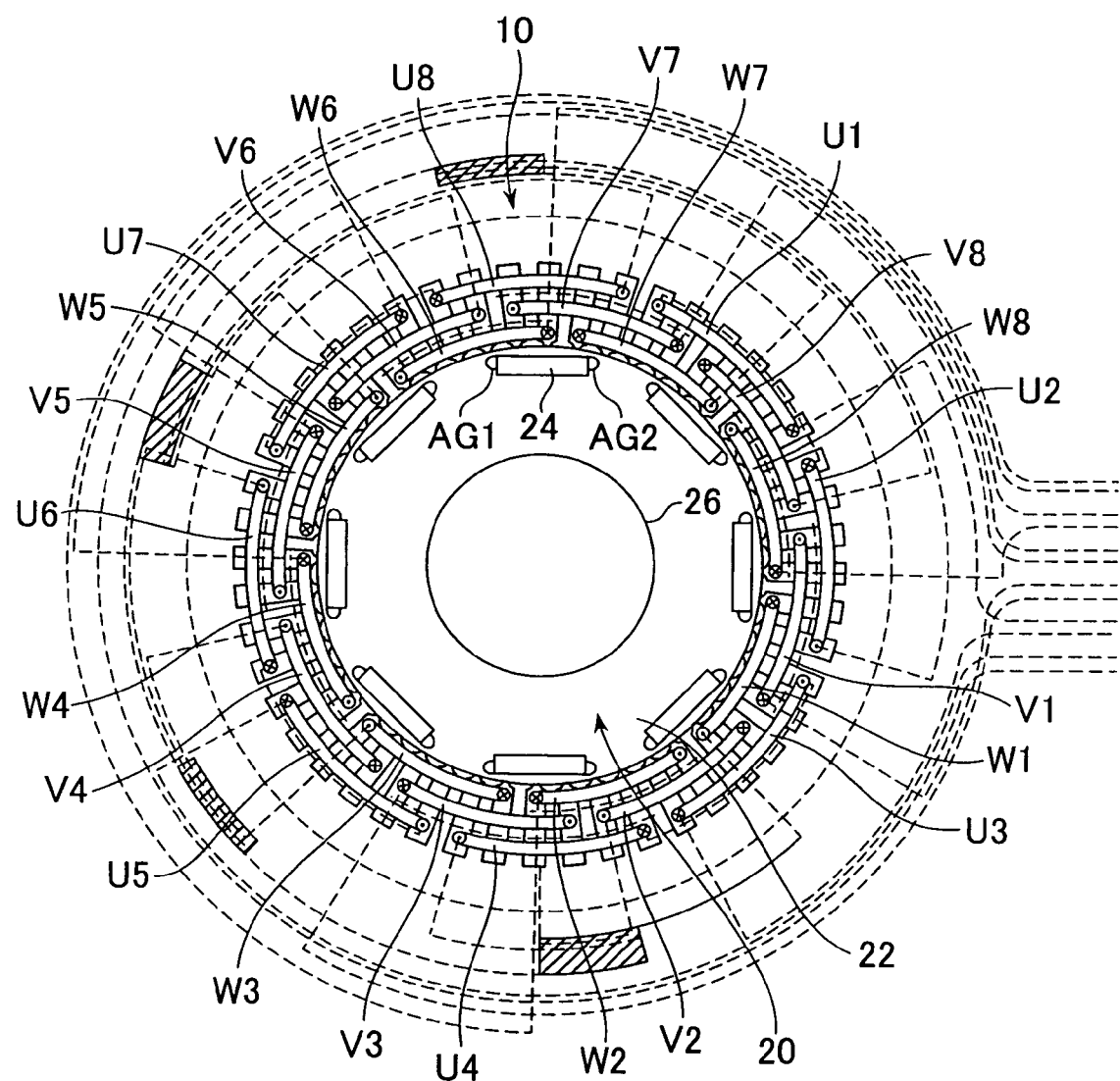
FIG. 2 is a cross-sectional view illustrating the overall configuration of the rotating electrical machine according to the first embodiment.

FIGS. 1 and 2 are cross-sectional views illustrating the configuration of the rotating electrical machine according to the first embodiment, with FIG. 1 showing a cross-sectional view in the direction of the rotating shaft, and FIG. 2 a cross-sectional view orthogonal thereto. Note that in FIGS. 1 and 2, as well as all other drawings, same reference numerals indicate the same components.

As shown in FIG. 1, the rotating electrical machine according to the first embodiment is configured of a stator 10, and a rotor 20 which is rotatably supported on the inner circumference side of the stator 10 with a gap therebetween. The stator 10 and rotor 20 are held within housing 30 of the rotating electrical machine.

The stator 10 is configured of a stator core 12 and stator coil 14. The stator core 12 is formed by laminating on a thin steel plate pressed into a predetermined shape. The stator core 12 is configured of a circular yoke core and multiple tooth cores disposed protruding therefrom in the radial direction at equal intervals in the circumferential direction. The yoke core and tooth cores are formed integrally. The inner circumference surface side of the stator core 12 is opened, with multiple slots formed continuously in the axial direction on the inner circumference portion of the stator core 12. These slots are groove-shaped space portions formed between the tooth cores adjacent in the circumferential direction; 48 slots are formed with the present embodiment. The stator coil 14 is formed by distributed winding on the tooth cores of the stator core 12. Note that "distributed winding" refers to a winding method wherein a coil is wound on the stator core 12 so as to be stored in two slots which are separated across multiple slots.

The stator coil 14 is configured of a U-phase stator coil, V-phase stator coil, and W-phase stator coil, continuously wound laminating a coil conductor. The stator coil 14 is wound on a spool according to a predetermined order using an automatic winder, and then inserted within a slot from a slot entrance portion of the stator core 14, and wound onto the stator core 12 using an automatic inserter. The stator coil 14 is inserted in the slot in the order of the U-phase stator coil, V-phase stator coil, and W-phase stator coil. The winding order of the stator coil 14 will be described later with reference to FIG. 8 and subsequent drawings. The coil end portions of the stator coil 14 protrude from the slot in both axial directions and are situated at both axial-direction end faces of the stator core 12.

The rotor 20 is configured of a rotor core 22, permanent magnets 24, and a shaft 26. the rotor core 22 is formed by laminating on a thin steel plate pressed into a predetermined shape, which is then fixed to the shaft 26. Multiple magnet insertion holes passing through the perimeter portion of the rotor core 22 are formed at equal intervals in the circumferential direction, in the axial direction of the rotor 20. With the present embodiment, eight magnet insertion holes are formed. Permanent magnets 24 are inserted into each of the permanent magnet insertion holes and fixed. The shaft 26 is rotatably borne by end brackets 32F and 32R, and bearings 34F and 34R, fixed to each side of the housing 30.

Next, as shown in FIG. 2, the rotor 20 is rotatably borne by unshown housing on the inner side of the stator 10. The stator coil is made up of the three phases of the U-phase, V-phase, and W-phase, with eight each of each phase, for a total of 24 stator coils U1, U2, and so on through U8, V1, V2, and so on through V8, and W1, W2, and so on through W8. Each stator coil, e.g., the stator coil U1, is inserted into slots which are separated by four slots into which other V-phase and W-phase coils are placed, i.e., so as to span multiple salient poles of the stator core 12. Note that a salient pole of the stator core 12 means a core portion formed between slots adjacent in the circumferential direction. Also, the other U-phase coils, V-phase coils, and W-phase coils are also wound by distributed winding on the salient poles of the stator core 12 inserted into slots which are separated by four slots into which other phase coils are placed, so as to span multiple salient poles of the stator core 12. The distributed winding configuration enables control over a wide range of revolutions up to high rotational speeds, rather than being restricted to lower rotational speeds, due to application of field-weakening control and reluctance torque and so forth.

The 24 stator coils U1, U2, and so on through U8, V1, V2, and so on through V8, and W1, W2, and so on through W8, are connected by a connection ring indicated by dotted lines for each phase, so that Y-connection is realized for each phase coil of the U-phase, V-phase, and W-phase. The connection rings are configured using bus bars formed of thin plates of a conductor, and supply the three-phase AC supplied from the inverter device to the phase coils. Note that delta connection may be realized by the connection ring instead of Y-connection.

The eight permanent magnets 24 are each inserted into the permanent magnet holes provided to the rotor core 22 of the rotor 20. The permanent magnets 24 are distributed at equal intervals in the circumferential direction of the rotor core 22. The permanent magnets 24 are magnetized so that the polarity (N pole and S pole) of the permanent magnets which are adjacent are of opposite polarity one from another in the circumferential direction of the rotor. The regions of the rotor core 22 between the adjacent permanent magnets serve as auxiliary magnetic poles. The auxiliary magnetic poles are regions whereby the magnetic circuits of the permanent magnets 24 are bypassed so that the magnetic flux directly acts upon the stator 10 side by the magnetomotive force of the stator 10, thereby generating reluctance torque. The torque generated by the rotating electrical machine is the combined torque of the torque generated by the magnetic flux of the permanent magnets 24, and the reluctance torque generated from the magnetic flux flowing through the auxiliary magnetic poles.

Also, magnetic gaps (slit portions) AG1 and AG2 are provided to the permanent magnet insertion holes where the permanent magnets 24 are inserted, on both end portions in the circumferential direction of the insertion positions of the permanent magnets 24. The gap portion may be a gap where air exists, or may be filled with a filler such as varnish or the like. The magnetic permeability of varnish is smaller than the magnetic permeability of the silicon steel sheet making up the rotor core 22, so cogging torque can be reduced by alleviating sudden change in the magnetic flux density on the rotor surface due to this gap (by making the gradient of magnetic density distribution of the permanent magnets between the circumferential-direction end portions of the permanent magnets and the auxiliary magnetic poles to be more gradual). Further, formation of the magnetic gap allows for smaller dimensions in the radial direction of the bridge portion formed at the boundary between the core portion at the stator side of the permanent magnets (magnetic pole piece) and the auxiliary magnetic poles, whereby leakage of magnetic flux can be reduced.

Figure 3:
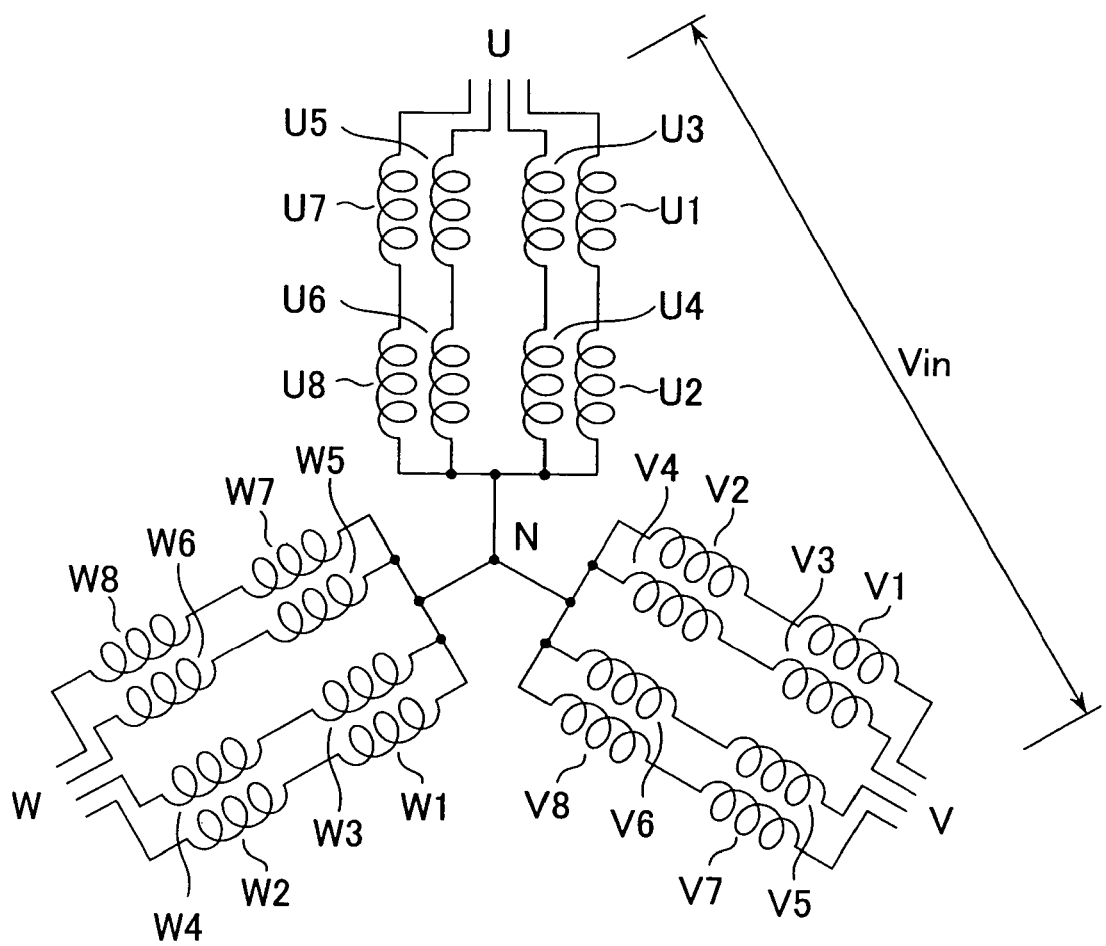
FIG. 3 is a connection diagram of a stator coil of the rotating electrical machine according to the first embodiment.

Next, the connection state of the stator coils in the rotating electrical machine according to the first embodiment will be described with reference to FIG. 3. FIG. 3 is a connection diagram of the stator coils in the rotating electrical machine according to the first embodiment. Note that in FIG. 3 and all other drawings, same reference numerals indicate the same components.

As shown in FIG. 3, a Y connection is formed between the U-phase stator coils U, V-phase stator coils V, and W-phase stator coils W of the stator coil 14. with regard to the U-phase stator coils U, two stator coils U1 and U2 are connected serially. Also, two each of the other coils, U3 and U4, U5 and U6, and U7 and U8, are connected serially, and further, the four coil groups of the serially-connected coils are connected in parallel. That is to say, the U-phase stator coils U are connected in a two-serial four-parallel arrangement. In the same way, the V-phase stator coils V and W-phase stator coils W also have the stator coils V1, V2, and so on through V8, and W1, W2, and so on through W8, connected in a two-serial and four-parallel arrangement. With this arrangement, AC voltage Vin is supplied from the power source to the serial circuit of the U-phase stator coils U and V-phase stator coils V. In the same way, AC voltage Vin is supplied from the power source to the serial circuit of the V-phase stator coils V and W-phase stator coils W, and to the serial circuit of the W-phase stator coils W and U-phase stator coils U. Note that the AC voltage supplied to the serial circuit of the U-phase stator coils U and V-phase stator coils V, the AC voltage supplied to the serial circuit of the V-phase stator coils V and W-phase stator coils W, and the AC voltage supplied to the serial circuit of the W-phase stator coils W and U-phase stator coils U, have the phases thereof offset by an electrical angle of 180°.

Figure 4:
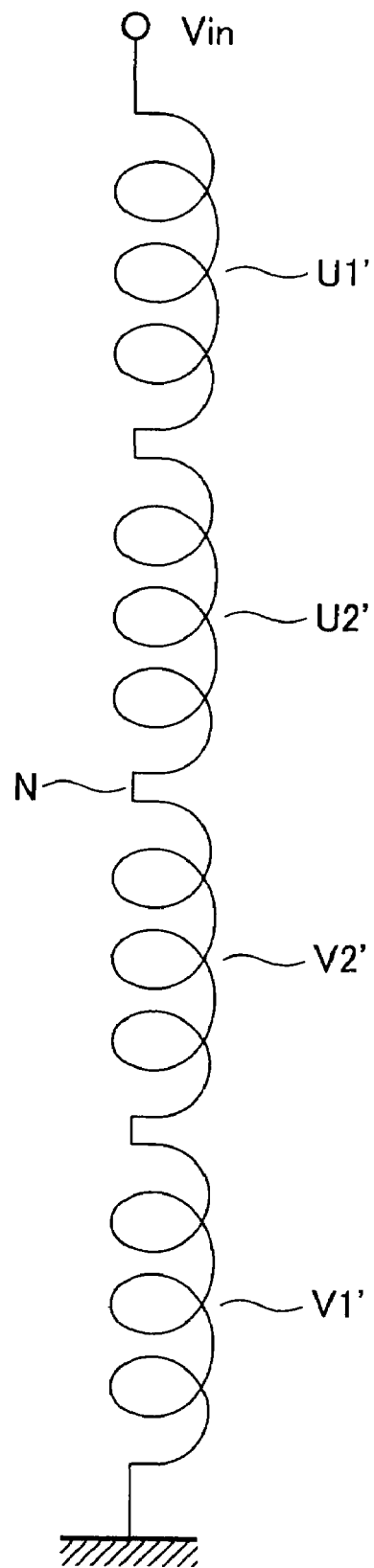
FIG. 4 is a schematic circuit diagram of the stator coil of the rotating electrical machine.
Figure 5:
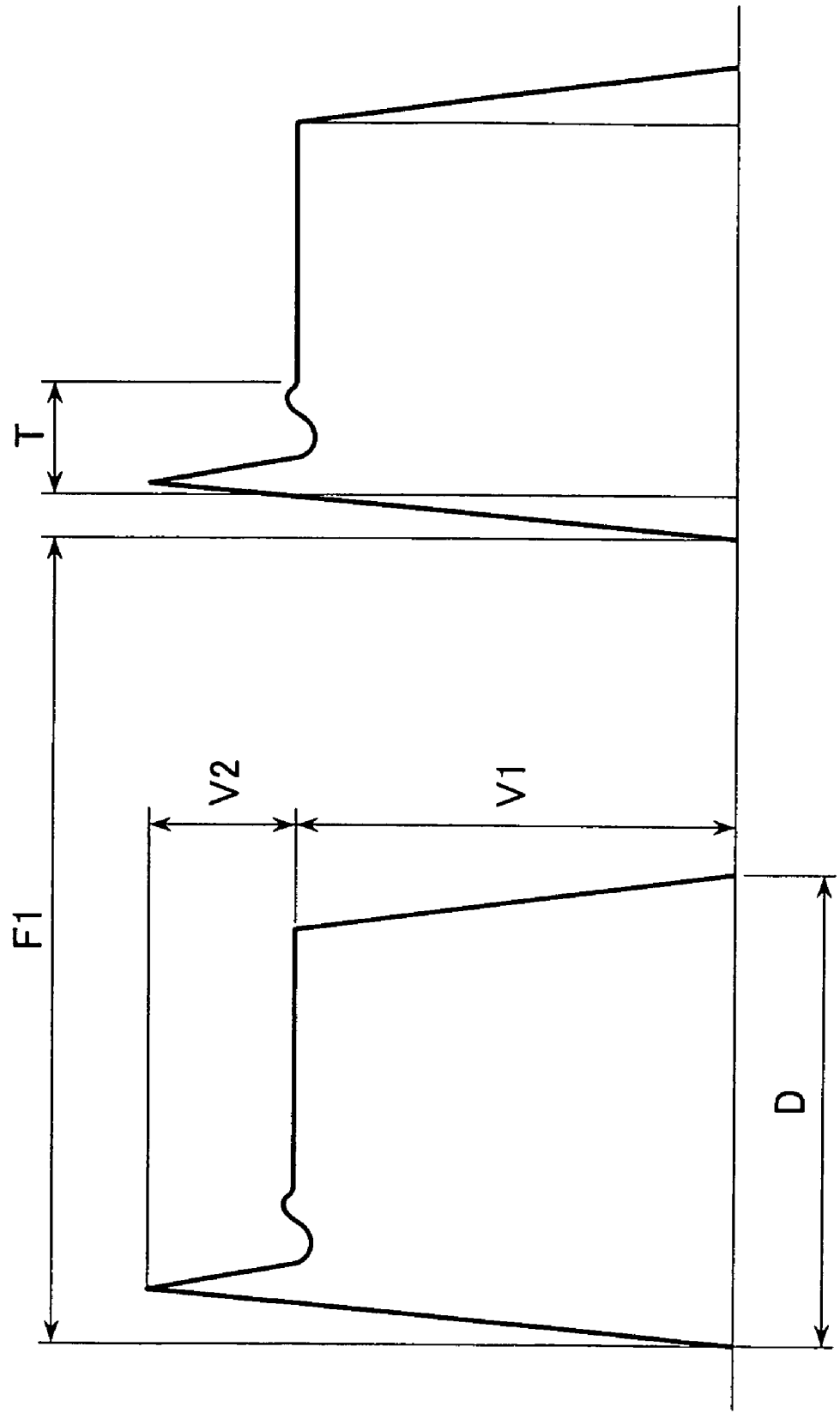
FIG. 5 is a waveform diagram of voltage applied to the stator coil after DC/AC conversion.
Figure 6:
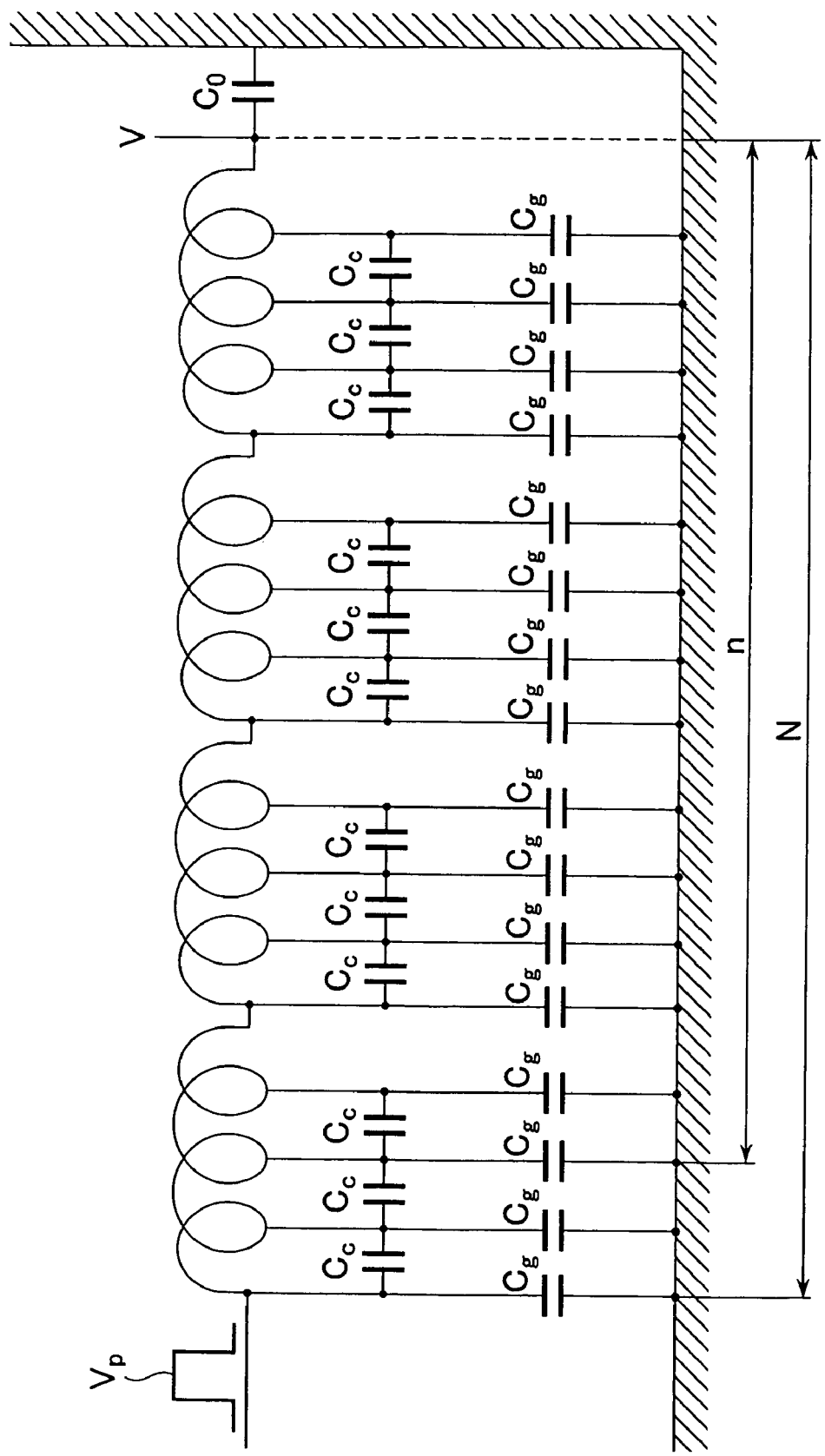
FIG. 6 is an equivalency circuit of the stator coil.
Figure 7:
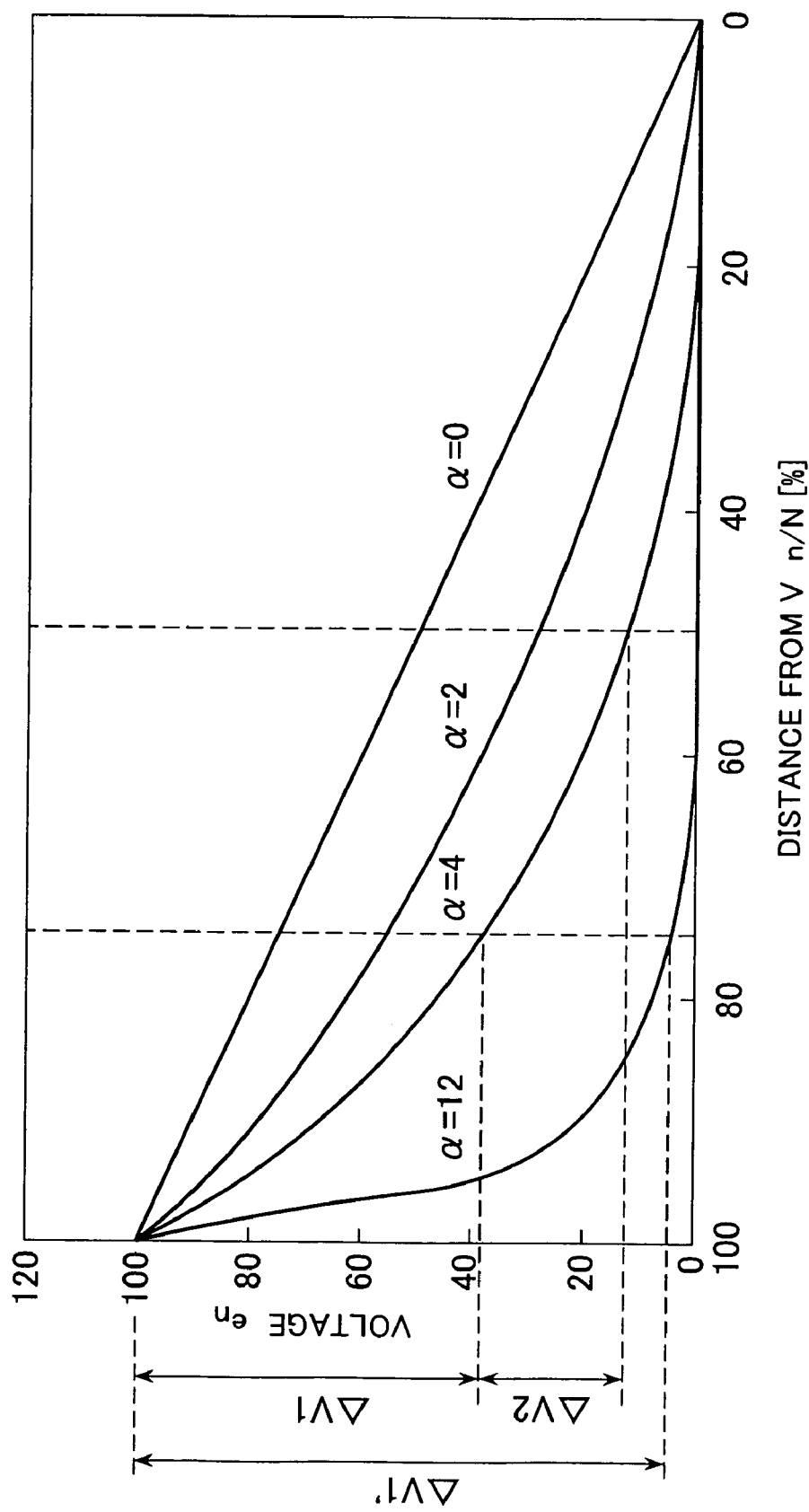
FIG. 7 is an explanatory diagram of to-ground potential en upon pulse voltage being applied to a coil.

Next, the voltage applied to each of the coils of the rotating electrical machine will be described with reference to FIGS. 4 through 7. FIG. 4 is a schematic circuit diagram of the stator coils of the rotating electrical machine, FIG. 5 is a waveform diagram of voltage subjected to DC/AC conversion and applied to the stator coils, FIG. 6 is an equivalency circuit of the stator coils, and FIG. 7 is an explanatory diagram of the to-ground potential en upon pulse voltage being applied to the coils.

As described with reference to FIG. 3, AC voltage Vin is supplied from the power source to the two-serial and four-parallel arrangement of V-phase coils V and the two-serial and four-parallel arrangement of the U-phase coils U. Accordingly, for the sake of considering the voltage applied to each coil, the serial circuit can be simplified to a circuit wherein four coils, U1', U2', V1', and V2', are directly connected. The AC voltage Vin is supplied to both ends of the four serial circuits.

Next, the waveform of the AC voltage Vin described with FIG. 4 will be described with reference to FIG. 5.

With an electric vehicle, the output voltage of a generator driven by the internal combustion engine is converted into DC voltage, and then stored in a battery or the like. Accordingly, AC voltage supplied to the rotating electrical machine has been converted from DC voltage into AC voltage using a power conversion circuit such as an inverter or the like. Converting DC voltage into AC voltage using such a power conversion circuit yields a voltage waveform such as shown in FIG. 5.

That is to say, as shown in FIG. 5, the output of the power conversion circuit exhibits a surge voltage with a voltage peak value of voltage V1+V2 at the time of voltage rising, due to the switching actions of semiconductor switching devices making up the power conversion circuit, following which the voltage goes to the desired voltage value V1. For example, if the voltage value V1 is 500 Vrms, the peak value V1+V2 of the surface value is 1300 V or even higher. On the other hand, the time T, which is the time over which the surge voltage V1+V2 continues, is short, e.g., several μs. Also, the surge voltage rising time is in the order of several hundred ns, for example. That is to say, while the surge voltage peak value is high, the duration thereof is short, so surge resistance can be improved without thickening the insulating covering, such as enamel covering, by realizing a structure wherein insulation destruction does not occur under this surge voltage.

Next, description will be made regarding the voltage applied to each coil in a case of the above-described surge voltage being supplied to the four serial circuits of stator coils shown in FIG. 4, with reference to FIGS. 6 and 7.

First, description will be made regarding a case wherein one end of the four serially-connected coils shown in FIG. 4 is grounded, and voltage is applied from the other end, as shown in FIG. 6. Grounding capacitance Cg exists between each turn of each winding wire of the coils and the ground. Also, inter-wire capacitance Cc exists between each turn of adjacent winding wires.

Now, with the combined capacity of multiple grounding capacitances Cg as C1, the grounding combined capacitance C1 is obtained from the following Expression (1)

$$C1 = \Sigma Cg(i) \quad (1)$$

wherein i represents 1 through n, n being the total number of grounding capacitances Cg.

In the same way, with the combined capacity of multiple inter-wire capacitances Cc as C2, the inter-wire combined capacitance C2 is obtained from the following Expression (2)

$$C2 = \Sigma cg(i) \quad (2)$$

wherein i represents 1 through n, n being the total number of inter-wire capacitances Cg. That is to say, this can be considered to be an LC circuit made up of the reactance L of the coil itself, the grounding combined capacitance C1, the inter-wire combined capacitance C2, and the grounding capacity C0 at the coil end.

Upon a pulsed voltage Vp such as shown in the drawing (corresponding to surge voltage) being applied from the open end of the coil, the coil acts as a delay circuit made up of the reactance L of the coil, the grounding combined capacitance C1, and the inter-wire combined capacitance C2.

Accordingly, with the number of winds of the entire coil as N, the voltage en at the n'th position from the ground side can be obtained from the following Expression (3)

$$en = (\cos h(\alpha \cdot (n/N)) + C0(\sqrt{C1 \cdot C2}) \cdot \sin h(\alpha \cdot (n/N))/(\cos h\alpha + C0(\sqrt{C1 \cdot C2}) \cdot \sin h\alpha)) \quad (3)$$

wherein $\alpha = (\sqrt{(C1 \cdot C2)})$, and h(x) is a hyperbolic function.

FIG. 7 illustrates how the voltage en at the n'th position changes according to α with the horizontal axis representing the n'th position n, and with the V-phase grounded so that C0=∞.

Now, in the event that four coils are connected serially, the voltage applied to each coil is the highest at the voltage input end of the 4-series circuit. For example, in the event that α=4, balance voltage ΔV1 of the first coil is applied to the first coil from the input end side (position of n/N=75%), while balance voltage ΔV2 of the second coil is applied to the second coil from the input end side, and as can be understood from the drawing, ΔV1>ΔV2.

Further, the smaller α is, the smaller the voltage ΔV1 applied to the first coil from the input end side is. With the total voltage applied as 100%, the balance voltage ΔV1 of the first coil in the case of α=4 is approximately 60%, but the balance voltage ΔV1' of the first coil in the case of α=12 is approximately 95%. That is to say, ΔV1<ΔV1'.

Accordingly, even in a case wherein a surge voltage of 1300 V or greater is applied to the 4-series circuit, insulation resistivity can be improved with regard to surge voltage even when using insulation covering such as enamel covering or the like with a thickness equivalent to that of conventional arrangements, by realizing a small α.

As described with reference to FIG. 6, the stator coil can be considered to be an LC circuit made up of the reactance L of the coil itself, the grounding combined capacitance C1, the inter-wire combined capacitance C2, and the grounding capacity C0 at the coil end, and while of these, the reactance L of the coil itself, the grounding combined capacitance C1, and the grounding capacity C0 at the coil end, are constant, the present Inventors have taken note of the fact that the inter-wire combined capacitance C2 can be changed by changing the winding configuration of the stator coil, and have devised a winding confirmation wherein the inter-wire combined capacitance C2 is great, in order to realize a small α.

Next, the winding configuration of the stator coils in the rotating electrical machine according to the first embodiment will be described with reference to FIGS. 8A through 12B. Note that in the following description, the number of winds of one stator coil, stator coil U1 for example, will be described as being 12T.

Figure 8A:
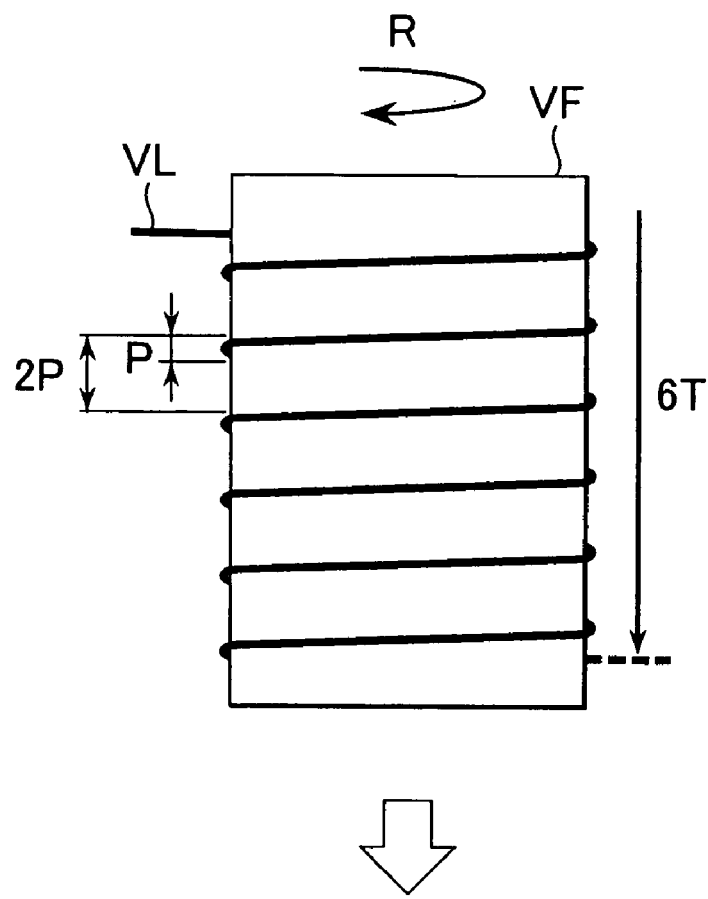
FIGS. 8A and 8B are explanatory diagrams of the winding method for the stator coil of the rotating electrical machine according to the first embodiment.
Figure 8B:
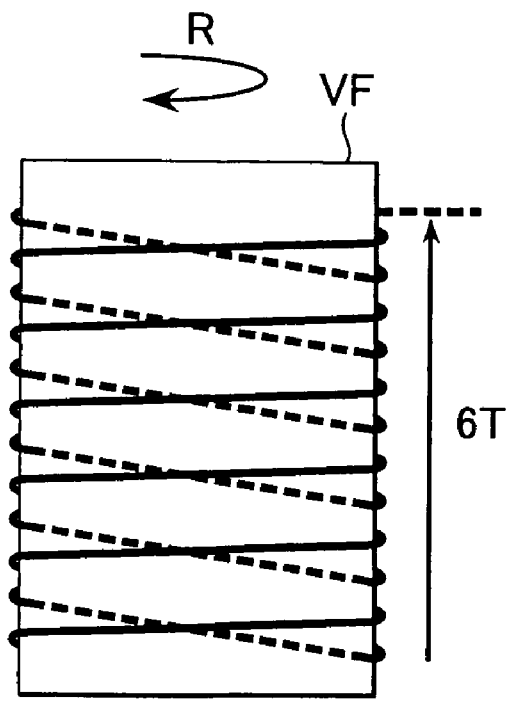
Figure 9:
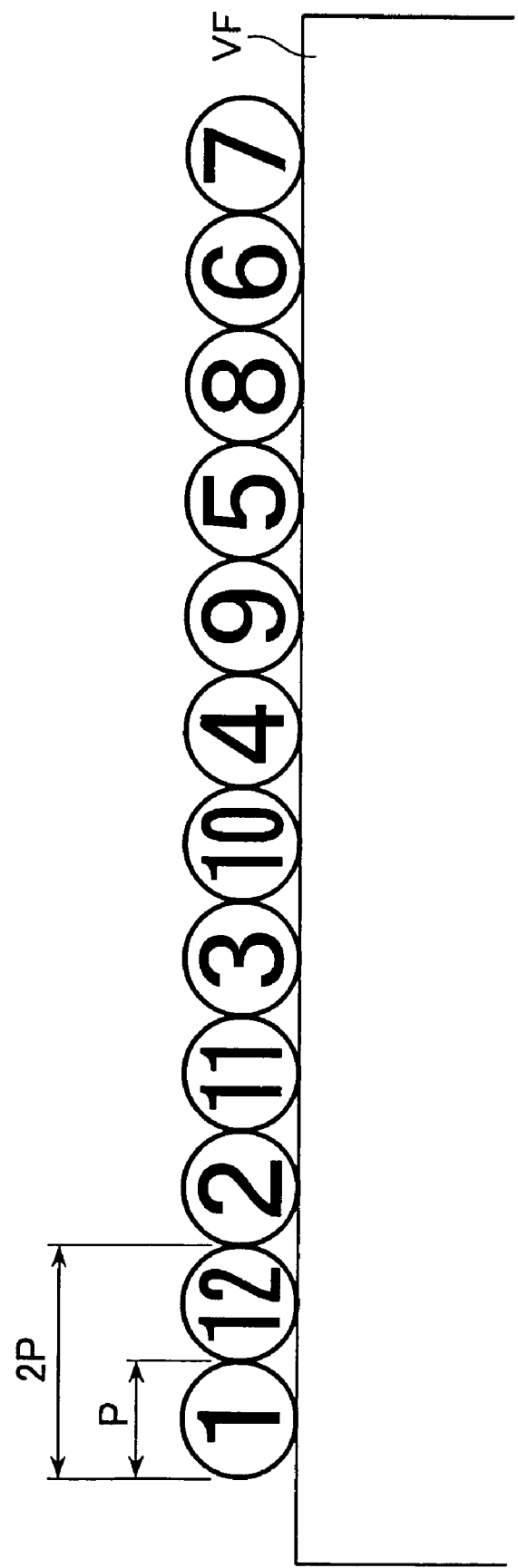
FIG. 9 is a placement diagram of winding wires of the stator coil of the rotating electrical machine according to the first embodiment.
Figure 10:
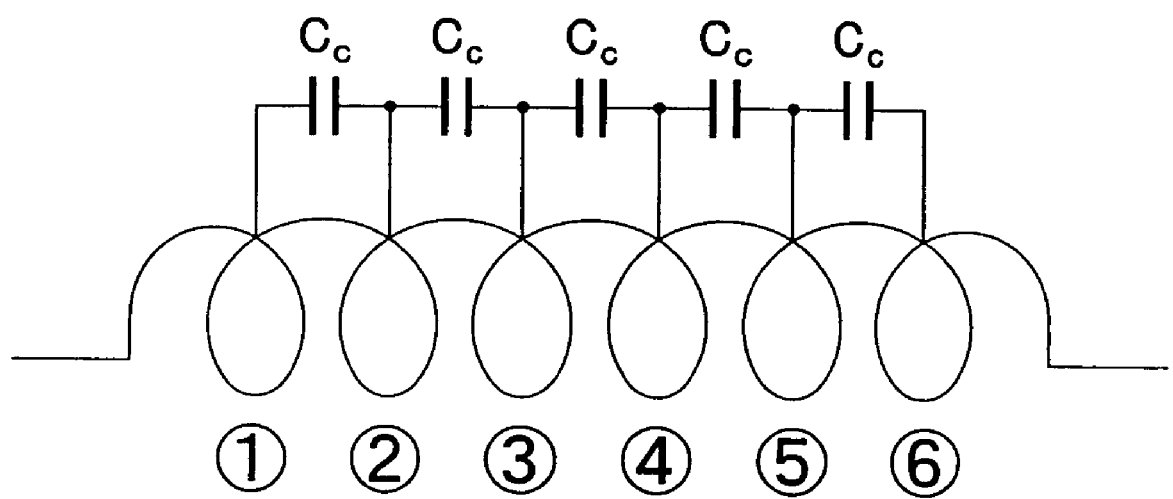
FIG. 10 is an explanatory diagram of capacitance in a conventional stator coil.
Figure 11A:
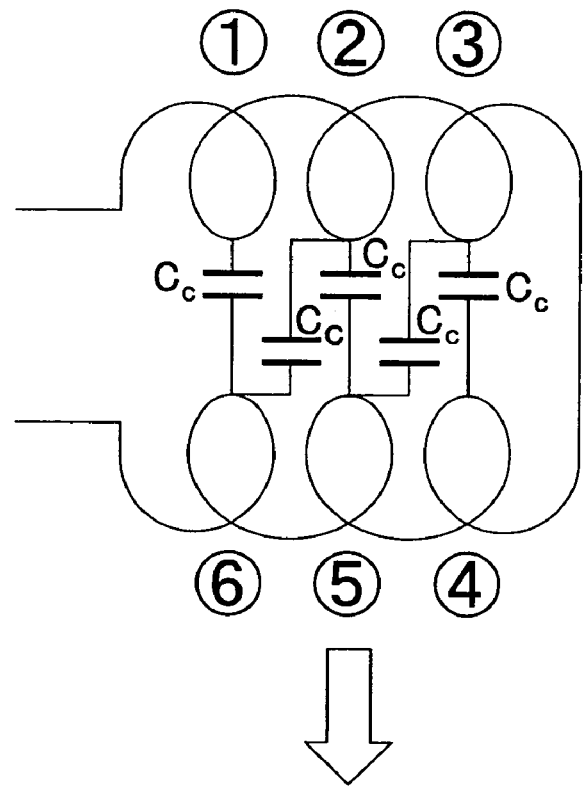
FIGS. 11A and 11B are explanatory diagrams of capacitance in the stator coil of the rotating electrical machine according to the first embodiment.
Figure 11B:
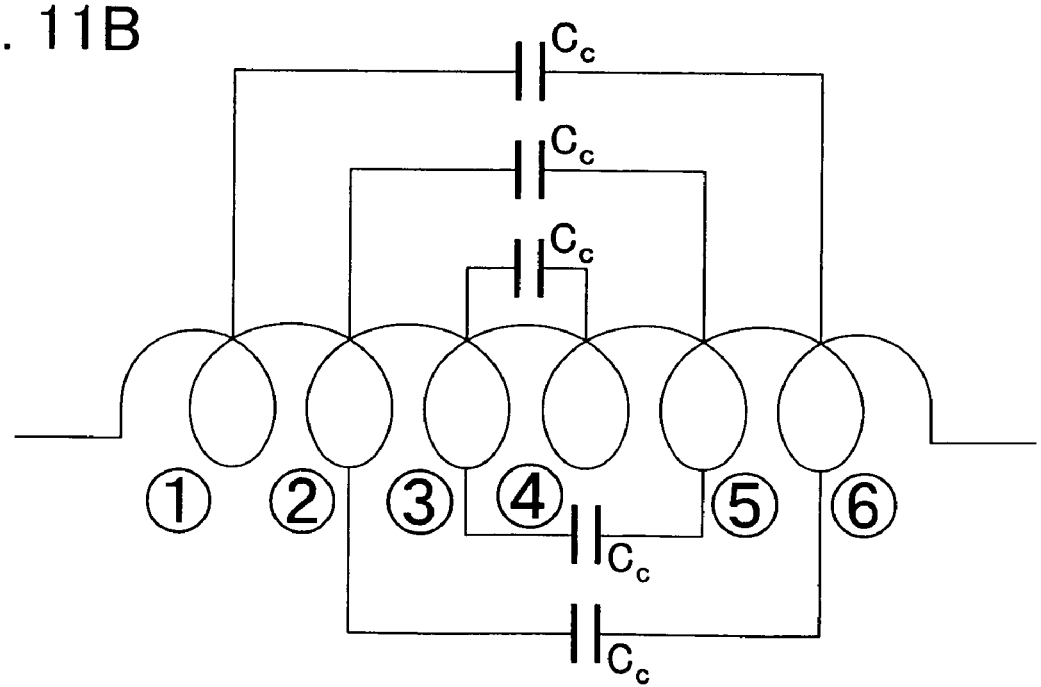

FIGS. 8A and 8B are explanatory diagrams regarding the winding method of a stator coil in the rotating electrical machine according to the first embodiment, FIG. 9 is a placement diagram of the winds at the time of winding the stator coil in the rotating electrical machine according to the first embodiment, FIG. 10 is an explanatory diagram of capacitance of a conventional stator coil, and FIGS. 11A and 11B are explanatory diagrams of capacitance with stator a coil in the rotating electrical machine according to the first embodiment.

With the first embodiment, the winding of one stator coil is divided (grouped) into two winding groups in continuous winding order units of the conducting wire, following which a predetermined number of turns are wound on a spool VL, sequentially, continuously, and turning back, using an automatic winder (two divided windings equal one reciprocal winding). That is to say, with the first embodiment, in the event that the number of winds of a stator coil is 12T (meaning 12 turns; here, "T" represents "turn", and will hereafter throughout the description of embodiments), different winding methods are used between the first winding group of 1T through 6T, and the second winding group of 7T through 12T. Note that with the conventional method, winding is performed so that 1T through 12T are arrayed in order.

That is to say, first, as shown in FIG. 8A, a conducting wire VL covered with insulation such as an enamel film or the like is wound sequentially in the same direction (R direction) for six winds onto a spool VF, using an automatic winder. At this time, the conducting wire VL is sequentially wound leaving a gap P, which is the diameter of the conducting wire VL, between adjacent winds. That is to say, 1T through 6T are wound with the winding pitch at 2P, as shown in FIG. 9.

Upon 6T being wound, the winding turns back at 6T, and the remaining 7T through 12T are wound in the gaps formed between 1T through 6T, in the same winding direction, as shown in FIG. 8B. Consequently, as shown in FIG. 9, the coil is arrayed in a single layer in the order of 1T, 12T, 2T, 11T, and so on to 8T, 6T, and 7T. Now, the winding wire wound on the spool must be arrayed in a single-layered state. Otherwise, the article cannot be inserted into the slot with the automatic inserter. The reason is that the width of the slot is slightly wider than the width of one winding wire, so the automatic inserter is not capable of inserting an arrangement with two or more layers. Note that the winding method using a conventional automatic inserter is arrayed winding in the order of 1T, 2T, 3T, and so on to 11T and 12T. Also note that the potion where the winding wires are arrayed in FIG. 9 is a portion 90° offset in the circumferential direction from the portion on the spool where the winding wires intersect.

Next, the capacitance of the coil wound arrayed thus will be described with reference to FIGS. 10 and 11A and 11B. Note that FIG. 10 illustrates a case of winding in order from 1T according to the conventional method, and FIGS. 11A and 11B illustrate the case of winding according to the first embodiment, described with reference to FIGS. 8A through 9. Also, the number of winds for the coil will be described as being 6T, to simplify explanation.

As shown in FIG. 10, with the conventional method, five inter-wire capacitances Cc are formed in the case of 6T coil, i.e., between 1T and 2T, between 2T and 3T, between 3T and 4T, between 4T and 5T, and between 5T and 6T, and these are serially connected. Accordingly, the inter-wire combined capacitance C2 is the combination of the five inter-wire capacitances Cc connected in parallel, thereby yielding (⅕)·Cc.

On the other hand, with the method according to the first embodiment, as shown in FIG. 11A, five inter-wire capacitances Cc are formed in the case of 6T coil, i.e., between 1T and 6T, between 2T and 6T, between 2T and 5T, between 3T and 5T, and between 3T and 4T. Opening FIG. 11A yields FIG. 11B, where the five inter-wire capacitances Cc are connected in parallel. Accordingly, the inter-wire combined capacitance C2 is the five parallel-connected inter-wire capacitances Cc combined, thereby yielding 5·Cc, meaning that the inter-wire combined capacitance C2 can be made greater.

Thus, as illustrated with FIGS. 8A through 9, the winding of one stator coil is divided into two winding groups, following which a predetermined number of turns are sequentially wound on a spool VL, (two divided windings equal one reciprocal winding), and at the time of winding the winding wire of the first winding group, a gap is left as wide as the diameter P of the winding wire. Further, at the time of winding the second winding group, the gap between the first group of winding wires is filled (or supplemented) by sequential winding. Such a winding method allows the inter-wire combined capacitance C2 to be increased, and α in Expression (3) to be reduced, as described with reference to FIG. 7. Accordingly, the balance voltage ΔV1 of the first coil can be reduced. Consequently, even in the event that surge voltage is supplied from the inverter to both ends of the stator coil made up of four serially connected coils, the balance voltage of the first coil can be reduced, so insulation destruction can be prevented even when using insulation covering such as enamel covering or the like with a thickness equivalent to that of conventional arrangements.

Figure 12A:
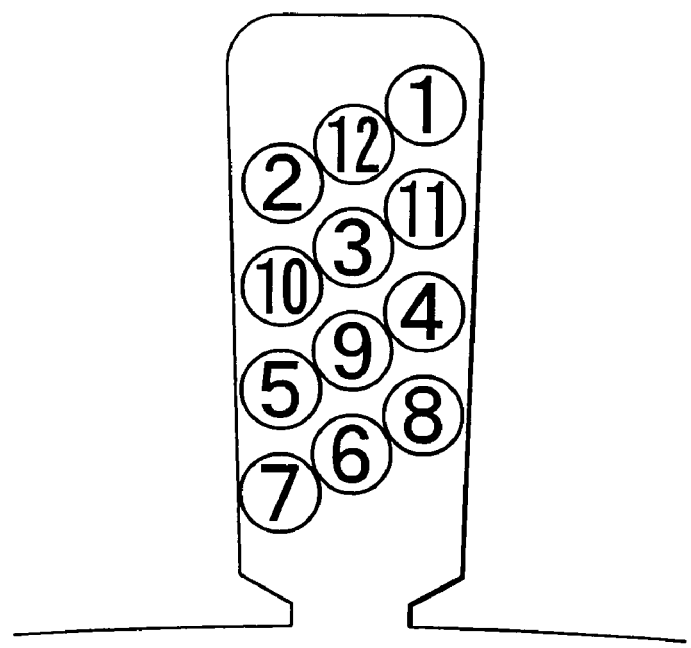
FIGS. 12A and 12B are placement diagrams of winding wires in a slot in the stator coil of the rotating electrical machine according to the first embodiment.
Figure 12B:
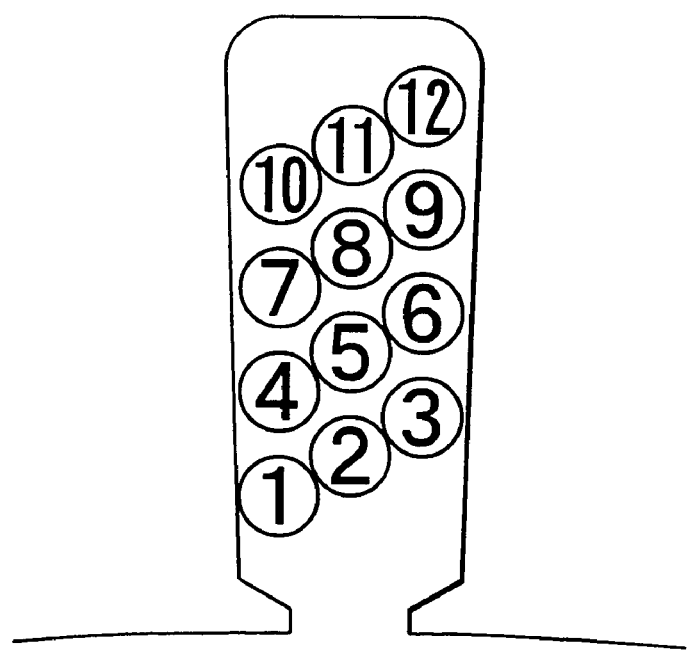

Next, the state of a stator coil inserted into a slot of the stator core will be described with reference to FIGS. 12A and 12B. FIGS. 12A and 12B are placement diagrams of winding wires within a slot in the stator core in the rotating electrical machine according to the first embodiment. Note that FIG. 12A illustrates the state of insertion into the slot employing the winding method according to the first embodiment, and FIG. 12B illustrates the state of insertion into the slot employing the conventional winding method.

As shown in FIGS. 8A through 9, with the first embodiment, winding is performed on a spool in a first group and second group, such that 12T is situated between 1T and 2T. Inserting a one-layer coil automatically wound in this way using an automatic inserter into a slot within the stator core results in an order approximately the same as that on the spool, as shown in FIG. 12A. Consequently, the starting 1T and the ending 12T are positioned at adjacent positions. That is to say, the conducting wire is positioned within the slot such that conducting wires belonging to different groups are adjacent one to another. The start and ending of winding of the coil need to be electrically connected externally from the rotating electrical machine using a connecting ring or the like, so the connecting process is facilitated by the starting wind 1T and the ending wind 12T being situated adjacently.

On the other hand, FIG. 12B illustrates a state wherein 1T through 12T are sequentially wound on the spool and inserted in the slot with an automatic inserter, whereby the starting wind 1T and the ending wind 12T are situated at distant positions.

While the above description has been made with regard to an arrangement wherein the number of winds of a stator coil is 12T, in reality, the number of winds is greater than that. For example, in a case of 44T, the number of winds of the first group and second group are 22T each, with 1T through 22T of the first group being wound on the spool with a gap equal to the diameter of the conducting wire being left between 1T through 22T, following which 23T through 44T of the second group are wound in order between the winds of the first group. Also, the number of winds is not restricted to an even number; in the event that the number of winds of a stator coil is 43T for example, the number of winds of the first group is 22T and the number of winds of the second group is 21T, with 1T through 22T of the first group being wound on the spool with a gap equal to the diameter of the conducting wire being left between 1T through 22T, following which 23T through 43T of the second group are wound in order between the winds of the first group.

As described above, according to the first embodiment, one stator coil is divided into two groups and wound onto a spool arrayed in a single layer such that the winds of the second group are situated between the winds of the first group, following which the wound wires are inserted into the slot of the stator core so as to form a stator coil, whereby balance voltage of the first coil can be reduced even in the event that surge voltage of the inverter is applied to the stator coil made up of four serially connected coils, thereby preventing destruction of insulation. Accordingly, insulation resistivity regarding surge voltage of the inverter improves, and moreover, high output with external dimensions around the same as conventional arrangements can be realized.

Further, the starting wind and ending wind of the stator coil can be situated adjacently, thereby facilitating connecting work.

Second Embodiment

Next, the configuration of a rotating electrical machine according to a second embodiment will be described with reference to FIGS. 13A through 15. Note that the overall configuration of the rotating electrical machine according to the second embodiment is the same as that shown in FIGS. 1 and 2.

Figure 13A:
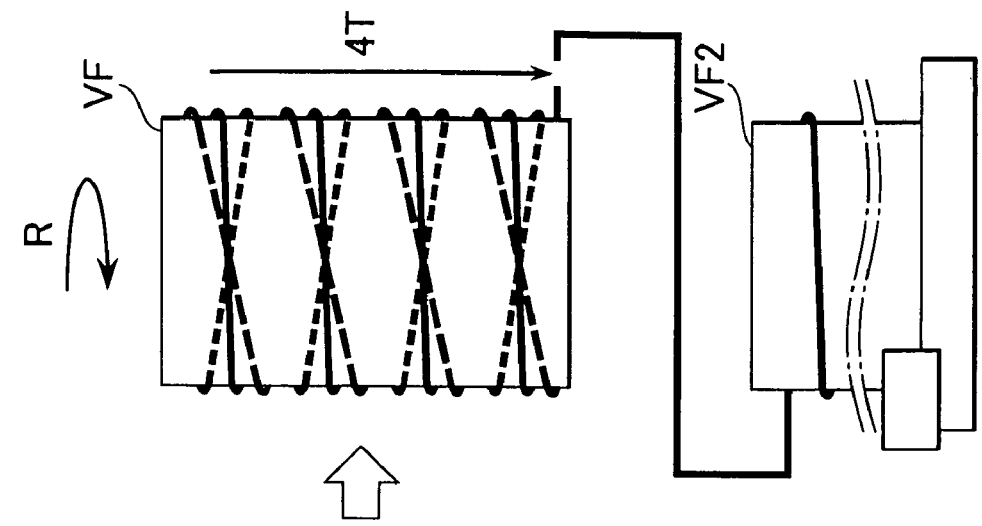
FIGS. 13A through 13C are explanatory diagrams of the winding method for the stator coil of the rotating electrical machine according to a second embodiment.
Figure 13B:
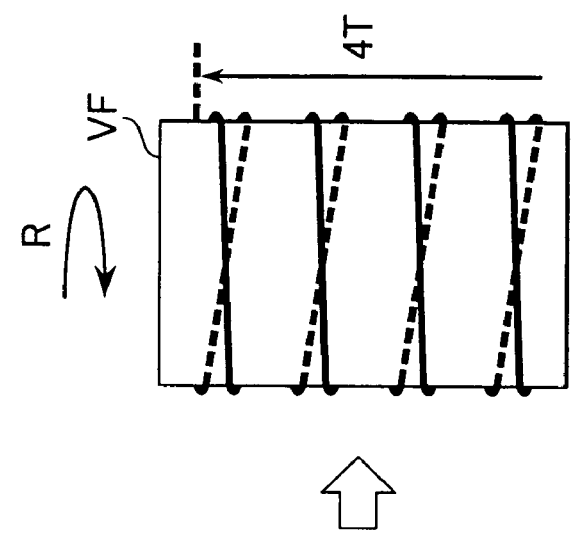
Figure 13C:
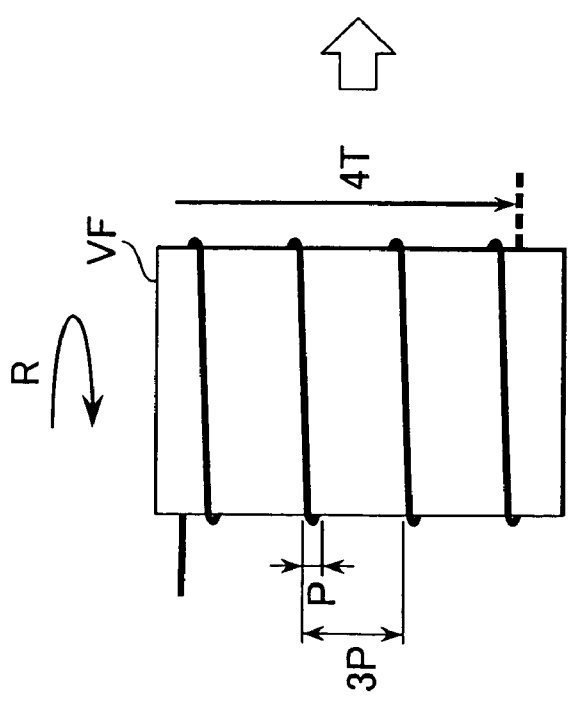
Figure 14:
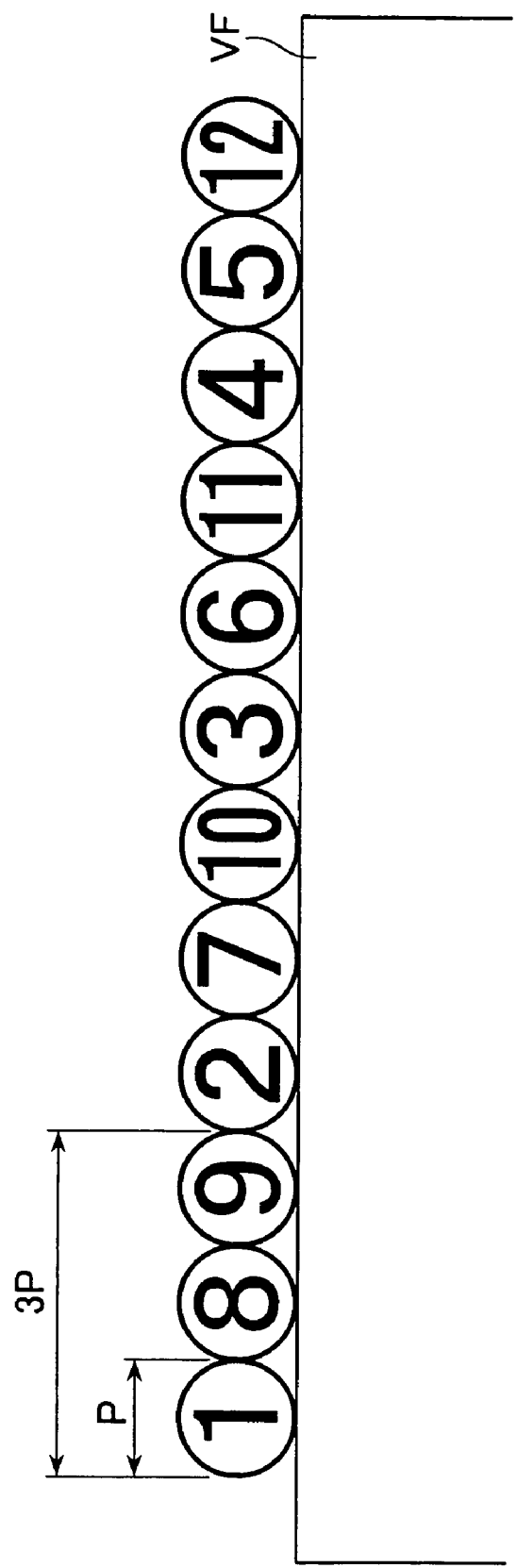
FIG. 14 is a placement diagram of winding wires of the stator coil of the rotating electrical machine according to the second embodiment.
Figure 15:
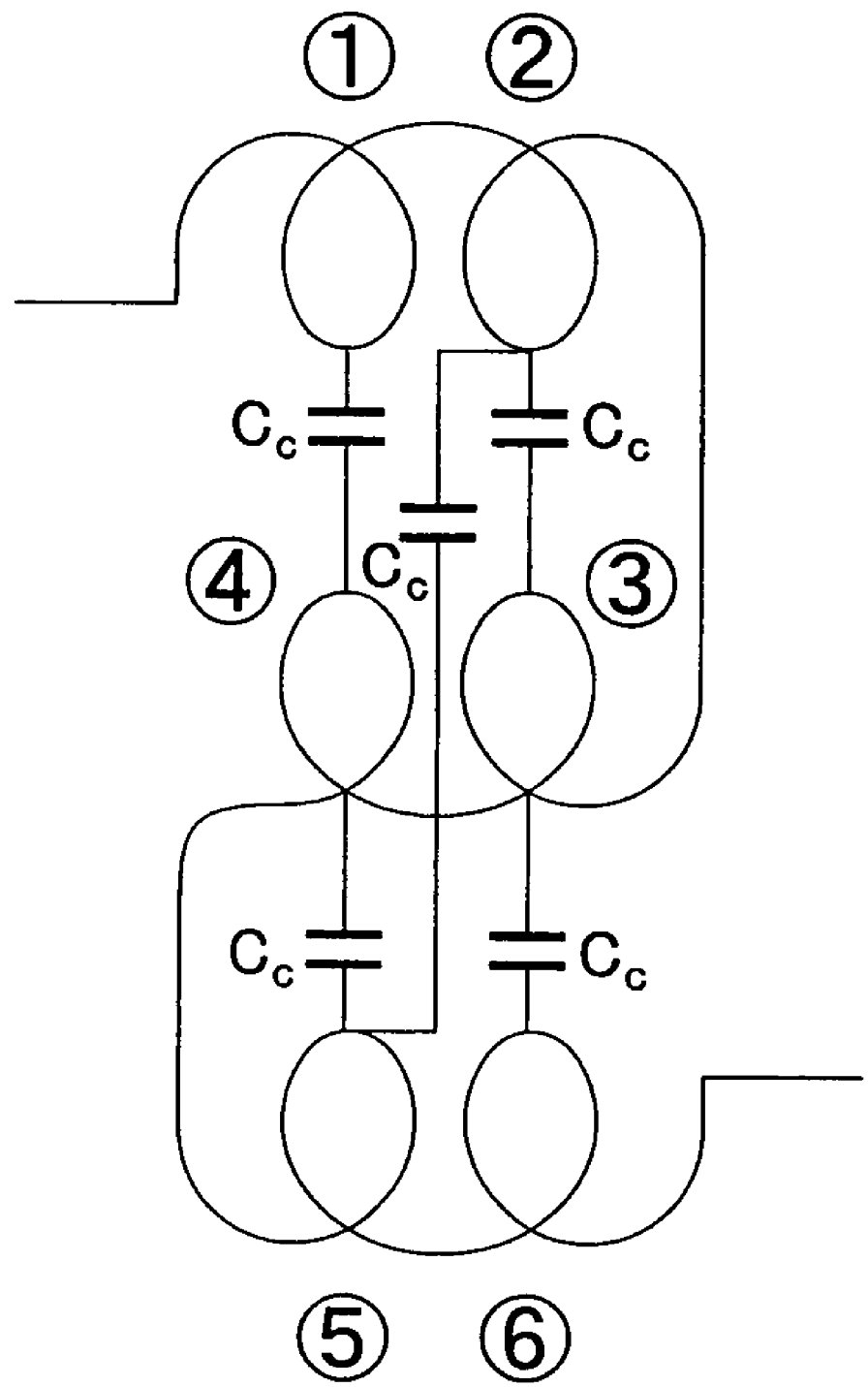
FIG. 15 is an explanatory diagram of capacitance in the stator coil of the rotating electrical machine according to a third embodiment.

FIGS. 13A through 13C are explanatory diagrams of a winding method for a stator coil in the rotating electrical machine according to the second embodiment, FIG. 14 is a placement diagram of winding wire wound on the stator coil in the rotating electrical machine according to the second embodiment, and FIG. 15 is an explanatory diagram of capacitance at the stator coil in the rotating electrical machine according to the second embodiment.

As with the case of the arrangement described with reference to FIGS. 8A through 9 and FIGS. 11A and 11B, the second embodiment will be described with the number of winds of a stator coil, the stator coil U1 for example, being 12T.

With the second embodiment, the winding of one stator coil is divided into three winding groups, following which a predetermined number of turns are sequentially wound on a spool VL, using an automatic winder (three divided windings equal one and a half reciprocal winding). That is to say, with the second embodiment, in the event that the number of winds of a stator coil is 12T, different winding methods are used between the first winding group of 1T through 4T, the second winding group of 5T through 8T, and the third winding group of 9T through 12T.

That is to say, first, as shown in FIG. 13A, a conducting wire VL covered with insulation such as an enamel film or the like is wound sequentially in the same direction (R direction) for four winds onto a spool VF, using an automatic winder. At this time, the conducting wire VL is sequentially wound leaving a gap 2P between adjacent winds, P being the diameter of the conducting wire VL. That is to say, 1T through 4T are wound with the winding pitch at 3P, as shown in FIG. 14.

Upon 4T being wound, the winding turns back at 4T, and 5T through 8T of the second group are wound in the gaps formed between 1T through 4T and adjacent to the wires of 1T through 4T, in the same winding direction, as shown in FIG. 13B.

Further, upon 8T being wound, the winding turns back at 8T, and 9T through 12T of the third group are wound in the gaps formed between 1T through 4T and 5T through 8T, in the same winding direction, as shown in FIG. 13C.

Consequently, as shown in FIG. 14, the coil is arrayed in a single layer in the order of 1T, 8T, 9T, 2T, 7T and so on to 4T, 5T, and 12T.

Further, in the event that there is a second spool VF2 and the first stator coil and the second stator coil are to be serially connected (a case wherein a serial connection is to be made such as with the stator coil U1 and the stator coil U2 shown in FIG. 3), the second stator coil is then wound on the second spool VF using the same procedures as illustrated in FIGS. 13A through 13C.

Next, the capacitance of the coil wound arrayed thus will be described with reference to FIG. 15. The number of winds for the coil will be described as being 6T, to simplify explanation, and also to enable comparison with FIGS. 10 through 11B.

As described above with FIG. 10, with the conventional method, the inter-wire combined capacitance C2 is the combination of the five inter-wire capacitances Cc connected in parallel, thereby yielding (⅕)·Cc.

On the other hand, with the method according to the second embodiment, as shown in FIG. 15, five inter-wire capacitances Cc are formed in the case of a 6T coil, i.e., between 1T and 4T, between 2T and 5T, between 2T and 3T, between 4T and 5T, and between 3T and 6T. Accordingly, the inter-wire combined capacitance C2 is a triple parallel arrangement of two serially connected Ccs and one single Cc, so the inter-wire combined capacitance C2 is 2·Cc, meaning that the inter-wire combined capacitance C2 can be made greater than with conventional arrangements.

Thus, the winding of one stator coil is divided into three winding groups, and sequentially wound on a spool VL, (three divided windings equal one and a half reciprocal winding), and at the time of winding the winding wire of the first winding group, a gap is left twice as wide as the diameter P of the winding wire. Further, at the time of winding the second winding group, the gap between the first winding wires is wound by sequential winding, so as to be adjacent to the winding wires of the first winding group. Moreover, at the time of winding the third winding group, the gap between the first winding wires and second winding wires is wound by sequential winding, between the winding wires of the first winding group and second winding group. Such a winding method allows the inter-wire combined capacitance C2 to be increased, and α in Expression (3) to be reduced, so the balance voltage ΔV1 of the first coil can be reduced, as described with FIG. 7. Consequently, even in the event that surge voltage is supplied from the inverter to both ends of the stator coil made up of four serially connected coils, the balance voltage of the first coil can be reduced, so insulation destruction can be prevented even when using insulation covering such as enamel covering or the like with a thickness equivalent to that of conventional arrangements.

While the above description has been made with regard to an arrangement wherein the number of winds of a stator coil is 12T, in reality, the number of winds is greater than that. For example, in a case of 42T, the number of winds of the first through third groups are 14T each, with 1T through 14T of the first group being wound on the spool with a gap twice to the diameter of the conducting wire being left between 1T through 14T, following which 15T through 28T of the second group are wound in order between the winds of the first group, so as to be adjacent to the winding wires of the first group. Further, 29T through 44T of the third group are sequentially wound between the winding wires of the first and second groups. Also, the number of winds is not restricted to a multiple of three; in the event that the number of winds of a stator coil is 43T for example, the number of winds of the first group is 15T and the number of winds of the second and third groups is 14T, with 1T through 15T of the first group being wound on the spool with a gap twice the diameter of the conducting wire being left between 1T through 15T, following which 16T through 29T of the second group are wound in order between the winds of the first group, so as to be adjacent to the winds of the first group. Further, 30T through 43T of the third group are wound in order between the winds of the first and second groups.

As described above, according to the second embodiment, one stator coil is divided into three groups and wound onto a spool arrayed in a single layer such that the winds of the second and third groups are situated between the winds of the first group, following which the wound wires are inserted into the slot of the stator core so as to form a stator coil, whereby balance voltage of the first coil can be reduced even in the event that surge voltage of the inverter is applied to the stator coil made up of four serially connected coils, thereby preventing destruction of insulation. Accordingly, insulation resistivity regarding surge voltage of the inverter improves, and moreover, high output with external dimensions around the same as conventional arrangements can be realized.

Also, in the event of winding two serially connected stator coils, the second winding can be easily performed following completion of the first winding, using a second spool.

Third Embodiment

Figure 16:
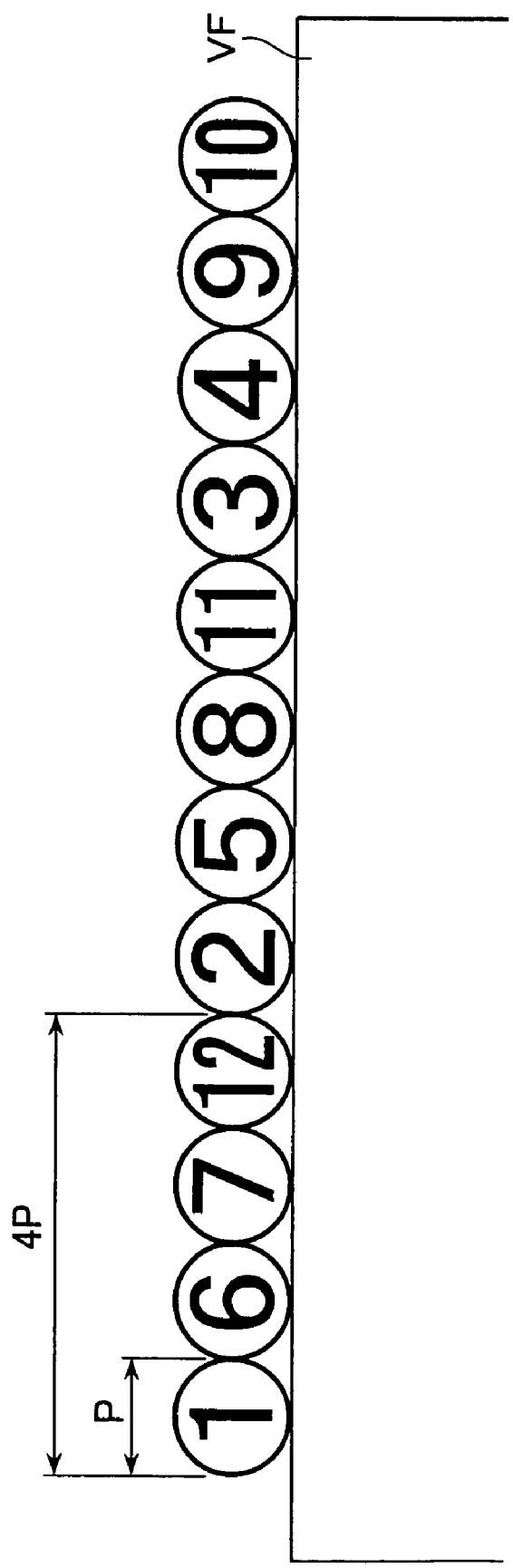
FIG. 16 is a placement diagram of winding wires of the stator coil of the rotating electrical machine according to the third embodiment.

Next, the configuration of a rotating electrical machine according to a third embodiment will be described with reference to FIG. 16. Note that the overall configuration of the rotating electrical machine according to the second embodiment is the same as that shown in FIGS. 1 and 2. FIG. 16 is a placement diagram of winding wire wound on the stator coil in the rotating electrical machine according to the third embodiment.

As with the case of the arrangement described with reference to FIGS. 8A through 9 and FIGS. 11A and 11B, the third embodiment will be described with the number of winds of a stator coil, the stator coil U1 for example, being 12T. With the third embodiment, the winding of one stator coil is divided into four winding groups, following which a predetermined number of turns are sequentially wound on a spool VL, using an automatic winder (four divided windings equal two reciprocal windings). That is to say, with the third embodiment, in the event that the number of winds of a stator coil is 12T, different winding methods are used between the first winding group of 1T through 3T, the second winding group of 4T through 6T, the third winding group of 7T through 9T, and the fourth winding group of 10T through 12T.

That is to say, first, as shown in FIG. 16, a conducting wire VL covered with insulation such as an enamel film or the like is wound sequentially in the same direction for three winds onto a spool VF, using an automatic winder. At this time, the conducting wire VL is sequentially wound leaving a gap 3P between adjacent winds, P being the diameter of the conducting wire VL. That is to say, 1T through 3T are wound with the winding pitch at 4P, as shown in FIG. 16.

Upon 3T being wound, the winding turns back at 3T, and 4T through 6T of the second group are wound in the gaps formed between 1T through 3T and adjacent to the wires of 1T through 3T leaving a gap of two winding wire, in the same winding direction, as shown in FIG. 16.

Further, upon 6T being wound, the winding turns back at 6T, and 7T through 9T of the third group are wound in the gaps formed between 1T through 3T and adjacent to the wires of 2T through 6T leaving a gap of one winding wire, in the same winding direction, as shown in FIG. 16.

Further, upon 9T being wound, the winding turns back at 9T, and 10T through 12T are wound in the gaps formed between 1T through 3T and 7T through 9T, in the same winding direction, as shown in FIG. 16.

Consequently, as shown in FIG. 16, the coil is arrayed in a single layer in the order of 1T, 6T, 7T, 12T, and so on to 3T, 4T, 9T, and 10T.

The inter-line capacitance of a coil of a coil wound arrayed in this way can be made greater than a conventional arrangement wherein 1T through 12T are sequentially wound.

Thus, the winding of one stator coil is divided into four winding groups, and sequentially wound on a spool VL, (four divided windings equal two reciprocal windings), and at the time of winding the winding wire of the first winding group, a gap is left three times as wide as the diameter P of the winding wire. Further, at the time of winding the second winding group, the gap between the first winding wires is wound by sequential winding, so as to be adjacent to the winding wires of the first winding group. Further, at the time of winding the third winding group, the gap between the first winding wires and second winding wires is wound by sequential winding, adjacent to the second winding group. Moreover, at the time of winding the third winding group, the gap between the first winding wires and second winding wires is wound by sequential winding, between the winding wires of the first winding group and third winding group. Such a winding method allows the inter-wire combined capacitance C2 to be increased, and α in Expression (3) to be reduced, so the balance voltage ΔV1 of the first coil can be reduced, as described with FIG. 7. Consequently, even in the event that surge voltage is supplied from the inverter to both ends of the stator coil made up of four serially connected coils, the balance voltage of the first coil can be reduced, so insulation destruction can be prevented even when using insulation covering such as enamel covering or the like with a thickness equivalent to that of conventional arrangements.

While the above description has been made with regard to an arrangement wherein the number of winds of a stator coil is 12T, in reality, the number of winds is greater than that. For example, in a case of 44T, the number of winds of the first through fourth groups are 11T each, with 1T through 11T of the first group being wound on the spool with a gap three times the diameter of the conducting wire being left between 1T through 11T, following which 12T through 22T of the second group are wound in order between the winds of the first group, so as to be adjacent to the winding wires of the first group. Further, 23T through 33T of the third group are sequentially wound between the winding wires of the first and second groups, so as to be adjacent to the winding wires of the second group. Moreover, 34T through 44T of the fourth group are sequentially wound between the winding wires of the first and third groups. Also, the number of winds is not restricted to a multiple of four; in the event that the number of winds of a stator coil is 43T for example, the number of winds of the first through third groups is 11T and the number of winds of the fourth group is 10T, and winding is performed as described above.

As described above, according to the third embodiment, one stator coil is divided into four groups and wound onto a spool arrayed in a single layer such that the winds of the second and third groups are situated between the winds of the first group, following which the wound wires are inserted into the slot of the stator core so as to form a stator coil, whereby balance voltage of the first coil can be reduced even in the event that surge voltage of the inverter is applied to the stator coil made up of four serially connected coils, thereby preventing destruction of insulation. Accordingly, insulation resistivity regarding surge voltage of the inverter improves, and moreover, high output with external dimensions around the same as conventional arrangements can be realized.

Summarizing the above-described first embodiment (FIGS. 8A through 9 and FIG. 11), second embodiment (FIGS. 13A through 15), and third embodiment (FIG. 16), a stator coil is divided into N groups (N=2, 3, or 4), and the number of winds of each group is the same or approximately the same (such that the difference in the number of winds for each group is "1"). First, the winding wire of the first group is wound onto the spool with a gap of ((N−1)·P) as to the diameter P of the conducting wire. Upon completion of the winding of the first group, the winding is turned back, and the second group is wound adjacent to the first group. In the event that N=3 or greater, the subsequent group is wound in the gap adjacent to the second group, thereby winding on to the spool arrayed in a single layer, following which the wound wires are inserted into a slot of the stator core, thereby configuring the stator coil.

Fourth Embodiment

Figure 17:
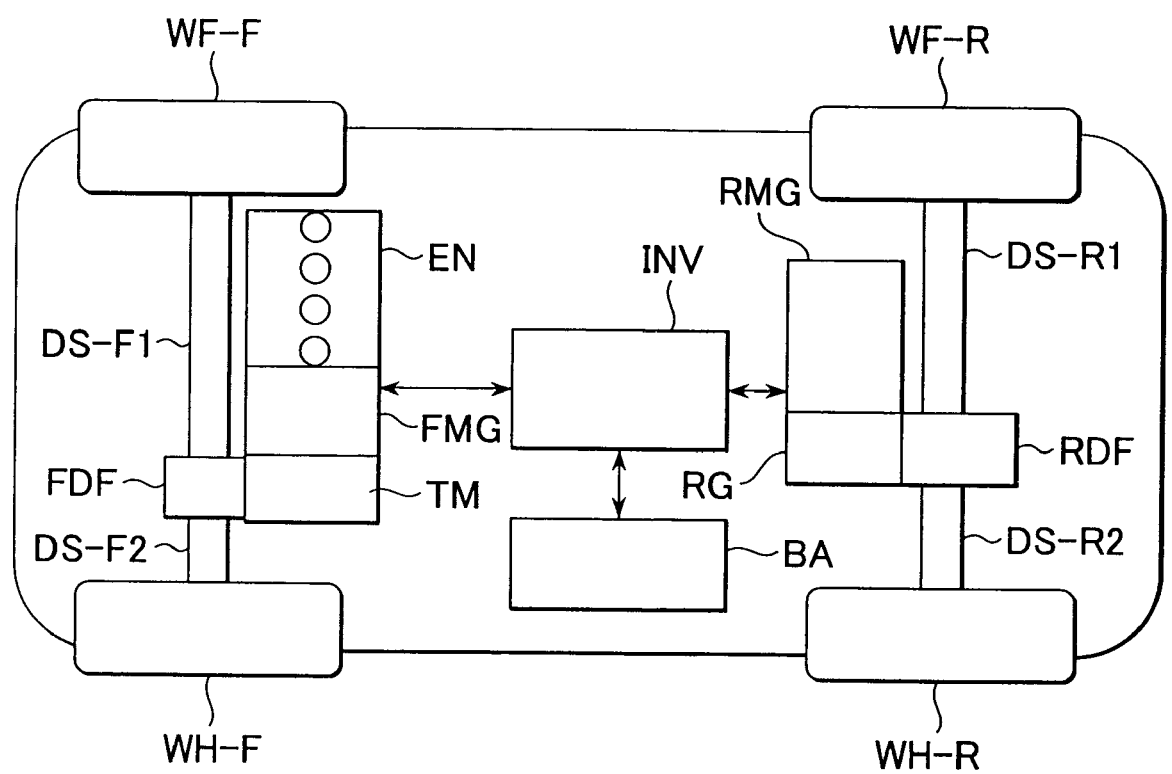
FIG. 17 is a block diagram illustrating the electric machine driving system in a hybrid electric automobile which is a type of electric automobile using the rotating electrical machine of the first through third embodiments, and is a fourth embodiment of the present invention.

Next, the configuration of an electrical machine driving system for a hybrid electric automobile, which is a type of electric automobile using the rotating electrical machine according to the first through third embodiments will be described with reference to FIG. 17 (fourth embodiment). FIG. 17 is a block diagram illustrating an electrical machine driving system for a hybrid electric automobile, which is a type of electric automobile using the rotating electrical machine according to the first through third embodiments.

The hybrid electric automobile according to the fourth embodiment is a four-wheel-drive arrangement wherein the front wheels WH-F are driven by an internal combustion engine EN and a front side motor generator FMG configured of the rotating electrical machine according to the first through third embodiments, and wherein the rear wheels WH-R are driven by a rear side motor generator RMG configured of the rotating electrical machine according to the first through third embodiments. Note that while description will be made in the present embodiment regarding an arrangement wherein the front wheels WH-F are driven by the engine EN and front side motor generator FMG and the rear wheels WH-R are driven by the rear side motor generator RMG, an arrangement may be made wherein the rear wheels WH-R are driven by the engine EN and the front side motor generator FMG configured of the rotating electrical machine described in the above embodiments and the front wheels WH-F are driven by the rear side motor generator RMG.

A transmission TM is mechanically connected to the front axle DS-F of the front wheels WH-F via a front-side differential FDF. The engine EN and motor generator MG are mechanically connected to the transmission TM via an output control mechanism, omitted from the drawings. This output control mechanism is a mechanism which governs combining and distributing of rotational output. The AC side of an inverter INV is electrically connected to the stator coil of the front-side motor generator FMG. The inverter INV is an electric power converting device for converting DC electric power into three-phase AC electric power, and controls the driving of the motor generator MG. A battery BA is electrically connected to the DC side of the inverter INV.

A rear-side motor generating RMG is mechanically connected to rear axles DS-R and DS-R2 of the rear wheels WH-R via a rear-side differential RDF and rear-side reduction gears. The AC side of the inverter INV is electrically connected to the stator coil of the rear-side motor generator RMG. Note that the inverter INV is shared between the front-side motor generator FMG and the rear-side motor generator RMG, and has a conversion circuit for the front-side motor generator FMG, a conversion circuit for the rear motor generator MGR, and a driving control unit for driving the former two. The configuration of the inverter INV will be described later with reference to FIG. 18.

When starting and when performing low-speed driving of the hybrid electric automobile (driving ranges where operating efficiency (gas mileage) of the engine EN is lower), the front wheels WH-F are driven by the front-side motor generator FMG. Now, while description will be made with this fourth embodiment regarding an arrangement of driving the front wheels WH-F with the front-side motor generator FMG when starting and when performing low-speed driving of the hybrid electric automobile, an arrangement may be made wherein the front wheels WH-F are driven with the front-side motor generator FMG and the rear wheels WH-R are driven with the rear-side motor generator RMG, i.e., four-wheel drive. DC power is supplied to the inverter INV from the battery BA. The supplied DC power is converted by the inverter INV into three-phase AC power. The three-phase AC power thus obtained is supplied to the stator coil of the front-side motor generator FMG. Thus, the front-side motor generator FMG is driven and generates rotational output. The rotational output is input to the transmission TM via an unshown output control mechanism. The input rotational output is changed by the transmission TM, and input to the differential FDF. The input rotational output is distributed to the left and right by the differential FDF, and is transmitted to the front axle DS-F at one side of the front wheels WH-F and the front axle DS-F at the other side of the front wheels WH-F. Thus, the front axles DS-F are rotationally driven. The rotational driving of the front axles DS-F then rotationally drives the front wheels WH-F.

During normal driving of the hybrid electric automobile (on dry pavement, in driving ranges where operating efficiency (gas mileage) of the engine EN is good), the front wheels WH-F are driven by the engine EN. The rotational output of the engine EN is input to the transmission TM via an unshown output control mechanism. The input rotational output is changed by the transmission TM, and is transmitted to the front axle DS-F by the differential FDF. Thus, the front axles DS-F are rotationally driven. Also, the charging state of the battery BA is detected, and in the event that there is need to charge the battery BA, the rotational output of the engine EN is distributed to the front-side motor generator FMG via the unshown in output control mechanism, so as to rotationally drive the front-side motor generator. Thus, the front-side motor generator FMG operates as a generator. This operation generates three-phase AC electric power at the stator coil of the front side motor generator FMG. The generated three-phase AC electric power is converted into predetermined DC power by the inverter INV. The DC power obtained by this conversion is supplied to the battery BA. Accordingly, the battery BA is charged.

During four-wheel driving of the hybrid electric automobile (driving ranges where operating efficiency (gas mileage) of the engine EN is good, while driving on roads with low μ, such as driving on snow), the rear-side motor generator RMG drives the rear wheels WH-R. Also, the engine EN drives the front wheels WH-F as with normal driving. Further, driving of the rear-side motor generator RMG uses the amount of charge in the battery BA, so the front-side motor generator FMG is rotationally driven by the rotational output of the engine EN so as to charge the battery BA. The rear wheels WH-R are driven by the rear-side motor generator RMG, and accordingly DC power is supplied to the inverter INV from the battery BA. The supplied DC power is converted into three-phase AC power by the inverter INV, and the AC power obtained by this conversion is supplied to the stator coil of the rear-side motor generator RMG. Accordingly, the rear-side motor generator RMG is driven, and generates rotational output. The generated rotational output is changed by the rear-side reducing gears RG, and input to the differential RDF. The input rotational output is distributed to the left and right by the differential RDF, and is transmitted to the rear axle DS-R1 at one side of the rear wheels WH-R and the rear axle DS-R2 at the other side of the rear wheels WH-R. Thus, the rear axles DS-R are rotationally driven. The rotational driving of the rear axles DS-R then rotationally drives the rear wheels WH-R.

At the time of accelerating of the hybrid electrical automobile, the engine EN and front-side motor generator FMG drive the front wheels WH-F. Now, while this fourth embodiment is described with regard to an arrangement wherein the engine EN and front-side motor generator FMG drive the front wheels WH-F at the time of acceleration of the hybrid electrical automobile, but an arrangement may be made wherein the engine EN and the front-side motor generator FMG drive the front wheels WH-F and the rear-side motor generator RMG drives the rear wheels WH-R, i.e., four-wheel drive. The rotational output of the engine EN and the front-side motor generator FMG is input to the transmission TM via the unshown output control mechanism. The input rotational output is changed by the transmission TM, and is transmitted to the front axle DS-F by the differential FDF. Thus, the front axles DS-F are rotationally driven.

At the time of regenerative operation of the hybrid electrical automobile (when reducing speed, such as braking, letting up on the accelerator, or letting the accelerator all the way up), the rotational output of the front wheels WH-F is transmitted to the front-side motor generator FMG via the front axle DS-F, differential FDF, transmission TM, and unshown output control mechanism. Thus, the front-side motor generator FMG operates as a generator. This operation generates three-phase AC electric power at the stator coil of the generator FMG. The generated three-phase AC electric power is converted into predetermined DC power by the inverter INV. The DC power obtained by this conversion is supplied to the battery BA. Accordingly, the battery BA is charged. On the other hand, the rotational output of the rear wheels WH-R is transmitted to the rear-side motor generator RMG via the rear axle DS-R, differential RDF of an automotive output transmitting device 100, and reducing gears RG, and rotationally drives the rear-side motor generator RMG. Thus, the rear-side motor generator RMG operates as a generator. This operation generates three-phase AC electric power at the stator coil of the generator RMG. The generated three-phase AC electric power is converted into predetermined DC power by the inverter INV. The DC power obtained by this conversion is supplied to the battery BA. Accordingly, the battery BA is charged.

The electrical driving system according to the fourth embodiment has excellent insulation resistivity even with great output, and has small-sized motor generators (rotating electrical machines), and accordingly can contribute to reduced size, reduced weight, and reduced cost of vehicles.

Figure 18:
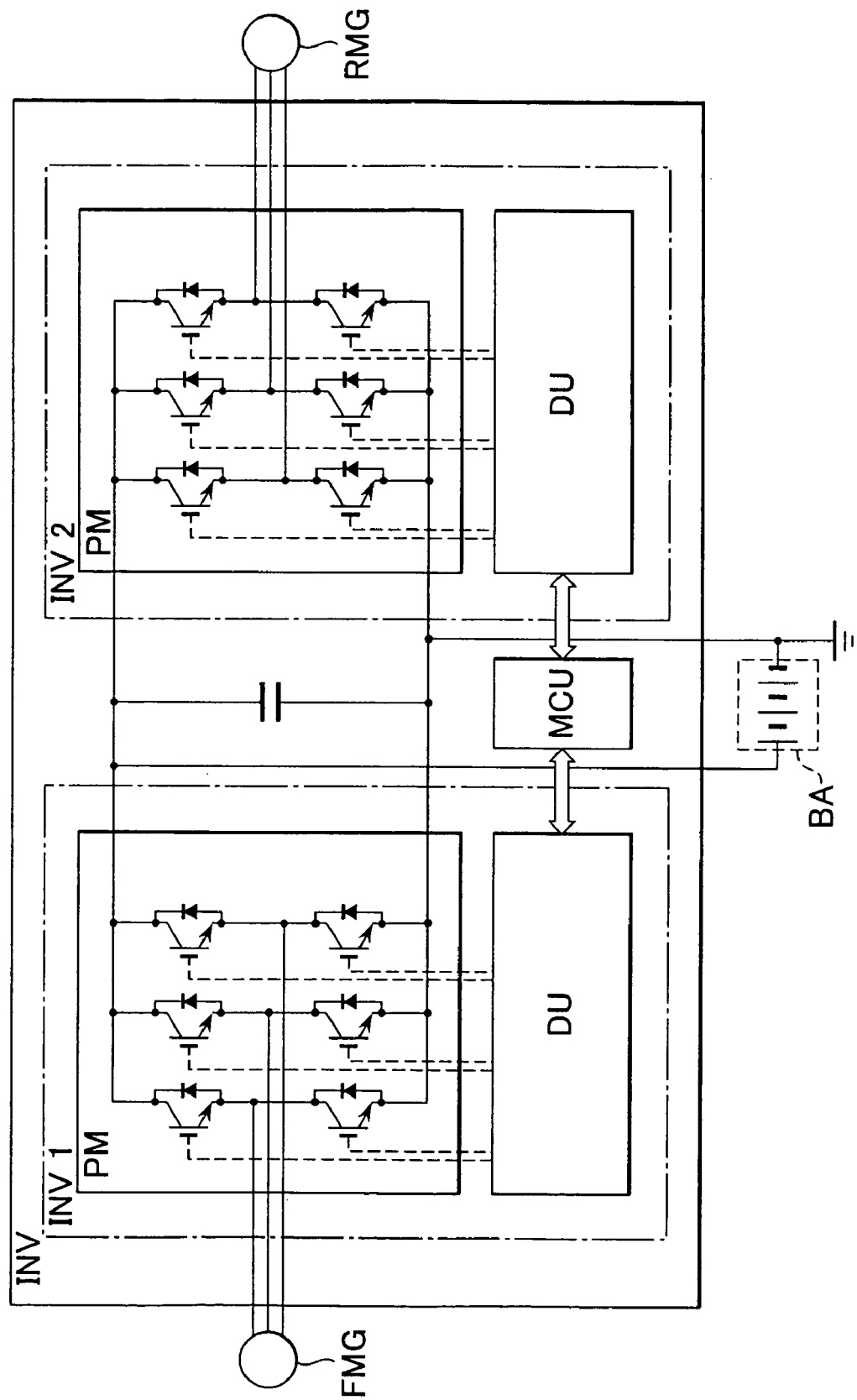
FIG. 18 is a block circuit diagram illustrating the circuit configuration of an inverter INV used in the electric machine driving system of the hybrid electric automobile shown in FIG. 17.

Next, the circuit configuration of the inverter INV used with the electrical machine driving system of the hybrid electric automobile shown in FIG. 17 will be described with reference to FIG. 18. FIG. 18 is a block circuit diagram illustrating the circuit configuration of the inverter INV used with the electrical machine driving system of the hybrid electric automobile shown in FIG. 17.

The inverter INV is made up of two inverters, INV1 and INV2. The two inverters INV1 and INV2 are of the same configuration. Each of the inverters INV1 and INV2 have a power module PM and driver unit DU. DC voltage is supplied from the battery BA to the power module PM, and each of the inverters INV1 and INV2 convert this into AC power to be supplied to the motor generators. Also, when the motor generators are operating as generators, the output of the generators is converted into DC power by the inverters INV1 and INV2, and stored in the battery BA.

The power module PM of the inverter INV1 is configured of six arms, and converts the DC supplied from the battery BA, which is the DC power source mounted on-board, and supplies power to the motor generators FMG and RMG which are rotating machines. Employed for the six arms of the power module PM are IGBTs (Insulated Gate Bipolar Transistors) which are semiconductor switching devices. Anther semiconductor switching device which can be used besides the IGBT is the power MOS-FET (Metal Oxide Semiconductor—Field Effect Transistor).

IGBTs are advantageous in that the operating speed is fast. In past years, the voltage which power MOS-FETs could handle was low, so high-voltage inverters were made with IGBTs. However, the voltage which power MOS FETs can handle has increased recently, so automobile inverters can be made with either semiconductor switching device. Power MOS-FETs are advantageous in that the semiconductor structure is simpler than that of IGBTs, so the manufacturing steps of the semiconductor are fewer than with IGBTs.

In FIG. 18, the upper arm and lower arm of each of the U-phase, V-phase, and W-phase are connected serially. The collector terminals (drain terminal in the event of using power MOS-FETs) of the upper arms of the U-phase, V-phase, and W-phase are connected to the positive terminal of the battery BA. On the other hand, the emitter terminals (source terminal in the event of using power MOS-FETs) of the lower arms of the U-phase, V-phase, and W-phase are connected to the negative terminal of the battery BA.

The connection point of the collector terminal (drain terminal in the event of using power MOS-FETs) of the U-phase upper arm and the emitter terminal (source terminal in the event of using power MOS-FETs) of the U-phase lower arm is connected to the U-phase terminal of the motor generator FMG (RMG), and U-phase current flows therethrough. In the case of a Y-connection of the armature coils (stator coils of a permanent-magnet synchronous motor), the current of the U-phase coil flows therethrough. The connection point of the collector terminal (drain terminal in the event of using power MOS-FETs) of the V-phase upper arm and the emitter terminal (source terminal in the event of using power MOS-FETs) of the V-phase lower arm is connected to the V-phase terminal of the motor generator FMG (RMG), and V-phase current flows therethrough. In the case of a Y-connection of the stator coils, the current of the V-phase coil flows therethrough. The connection point of the collector terminal (drain terminal in the event of using power MOS-FETs) of the W-phase upper arm and the emitter terminal (source terminal in the event of using power MOS-FETs) of the W-phase lower arm is connected to the W-phase terminal of the motor generator FMG (RMG), and W-phase current flows therethrough. In the case of a Y-connection of the stator coils, the current of the W-phase coil flows therethrough. Converting the DC power supplied from the battery BA into Ac power and supplying this to the stator coils of the there phases, i.e., U-phase, V-phase, and W-phase, making up the stator of the motor generator FMG (RMG) rotationally drives the rotor by the magnetomotive force generated by the electric current flowing through the stator coils of the three phases.

The driver units DU which generate gate signals are controlled by a motor control unit RM, and gate signals from driver units of each phase are supplied to the semiconductor switching devices of each of the phases. Conducting/non-conducting (off) of each of the arms is controlled by these gate signals. The DC supplied is thereby converted into three-phase AC. Generating three-phase AC is a known art, and accordingly detailed description thereof will be omitted here.

Fifth Embodiment

Next, the configuration of the rotating electrical machine according to a fifth embodiment of the present invention will be described with reference to FIGS. 19 through 20C. The overall configuration of the rotating electrical machine according to the second embodiment is the same as that shown in FIGS. 1 and 2, and the connection diagram of the stator coils in the rotating electrical machine according to the present embodiment is the same as with FIG. 3.

Figure 19:
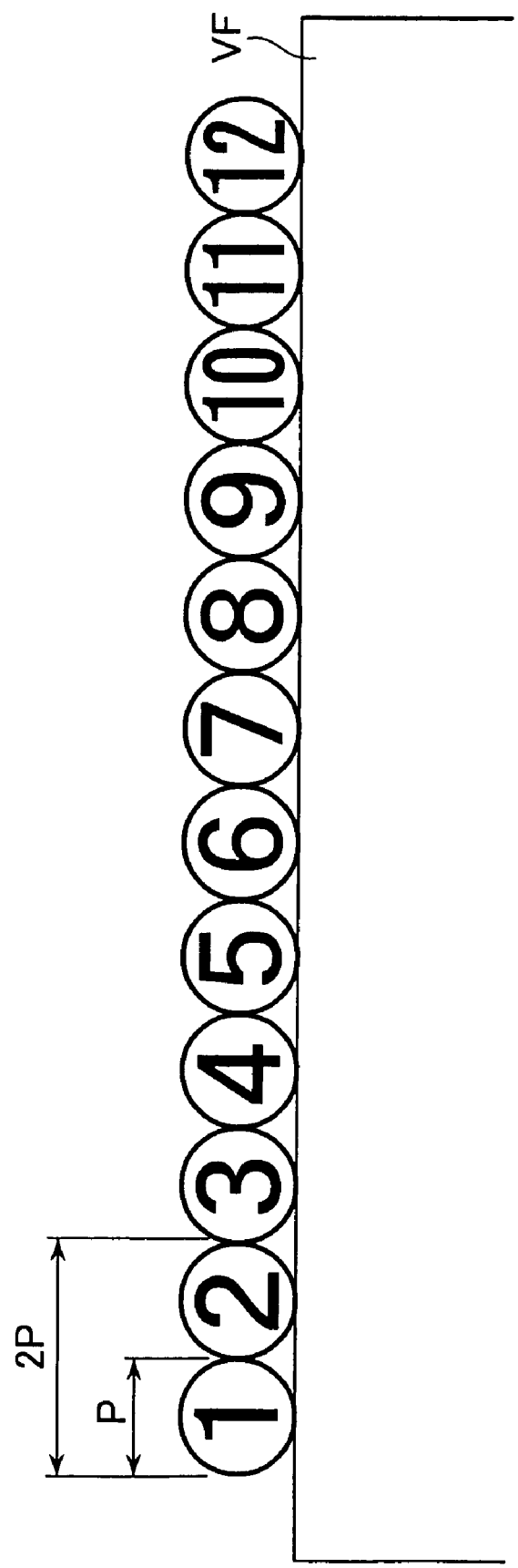
FIG. 19 is a placement diagram of winding wires of the stator coil of the rotating electrical machine according to a fifth embodiment of the present invention.
Figures 20A, 20B, 20C:
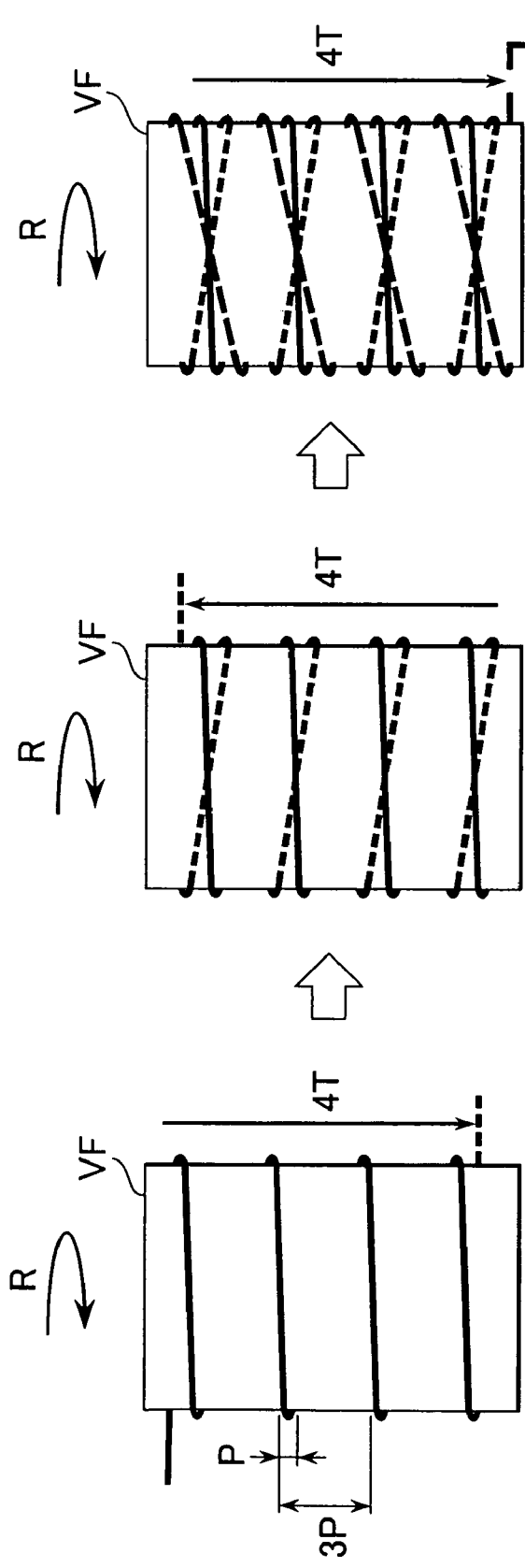
FIGS. 20A through 20C are explanatory diagrams of the winding method for the stator coil of the rotating electrical machine according to the fifth embodiment of the present invention.

FIG. 19 is a placement diagram of the winds at the time of winding the stator coil in the rotating electrical machine according to the fifth embodiment of the present invention, and FIGS. 20A through 20C are explanatory diagrams of the winding method for winding the stator coil in the rotating electrical machine according to the fifth embodiment of the present invention.

As shown in FIGS. 8A and 8B, in the event of winding the first group coil on the spool VF leaving a gap and subsequently sequentially winding the second group coil in that gap (in the case of one reciprocal winding), the second group coil crosses the first group coil. In the same way, in the event of winding the first group coil on the spool VF leaving a gap and subsequently sequentially winding the second group coil and further sequentially winding the third group coil in that gap (in the case of one and a half reciprocal windings), the second group coil crosses the first group coil and the third group coil crosses the second group coil.

Now, in the event of sequentially inserting coils from the entrance of a slot of the stator as shown in FIG. 12A in the sate of the coils being crossed, the crossed portion occurs at the slot end portions, i.e., the coil end portion 14, and not inside the slot. As described with reference to FIG. 2, the axial direction length of the coil end portion 14 is long to begin with in the case of performing distribution winding of the stator coil, and in addition to this, the crossed portions occurring at the coil end portion makes the axial direction length of the coil end portions even longer. The coil end portions are all formed by bending toward the perimeter of the stator core in the radial direction, following which the stator 10 is inserted in the housing 30 as shown in FIG. 1, thereby manufacturing the rotating electrical machine.

Now, in the event that the inner diameter of the housing 30 is 214 mm for example, the external dimensions of the stator 10 need to be within the inner diameter of the housing 30, i.e., within 214 mm, to insert the stator 10 within the housing 30.

As can be seen from FIG. 3, coils of each phase are made up of eight coils each, for a total of 24 coils making up the stator coil. The amount of increase in length in the axial direction of the coil end potion of a single coil described above due to cross portions is minute, but in the event of one reciprocal winding such as shown in FIGS. 8A and 8B, or one and a half reciprocal windings such as shown in FIGS. 13A through 13C for all 24 coils, the overall coil end length becomes considerably longer. As a result, bending the coil end portions toward the perimeter of the stator core in the radial direction makes the external diameter of the stator to be greater than the inner diameter of the housing 30. For example, the external diameter of the stator in the case of the one and a half reciprocal windings shown in FIGS. 13A through 13C is 218 mm.

To solve such problems, the present embodiment uses the following configuration. That is, as shown in FIG. 3, in the event that coils of each phase are configured of eight coils, in a two-serial four-parallel arrangement, let us pay particular attention to the two sequentially connected coils, and the arrangement wherein U-phase and V-phase coils from four sequentially connected coils as shown in FIG. 4, in which the highest voltage is applied to the coil U1' in the event of high voltage Vin being applied to the four sequentially connected coils. Also note that there are cases wherein high voltage is applied to the coil V1' side as well. That is to say, high voltage is applied to the lead start side coil U1' or the coil V1'. Also note that the voltage balance in the four sequentially connected coils shown in FIG. 4 is such that the voltage is greatest at the first coil on the high-voltage side (the lead side).

Accordingly, with the present embodiment, in the event that the coils of each phase are to be configured of two sequentially connected coils as shown in FIG. 3 for example, the coils U1, U3, U5, U7, V1, V3, V5, V7, W1, W3, W5, and W7, at the lead side, are formed with the one and a half reciprocal windings shown in FIGS. 13A through 13C. On the other hand, the coils U2, U4, U6, U8, V2, V4, V6, V8, W2, W4, W6, and W8, situated at the side of the neutral point N are formed with a coil winding arrangement according to the arrayed winding described later with reference to FIG. 19.

Now, the coil winding arrangement of arrayed winding will now be described with reference to FIG. 19. In the event that the coil U2 shown in FIG. 3 is configured with 12 turns, for example, a conducting wire VL covered with an insulating covering such as an enamel film or the like is sequentially wound in the same direction on a spool VF for 12 turns, using an automatic winder, as shown in FIG. 19. At this time, the diameter of the conducting wire VL is P, and sequential winding is performed without any gaps between adjacent winds, so that the winds are adjacent one to another. This winding configuration is called arrayed winding.

In an arrangement wherein the coil winding arrangement of arrayed winding shown in FIG. 19 is applied to the coils U2, U4, U6, U8, V2, V4, V6, V8, W2, W4, W6, and W8, situated at the side of the neutral point N, the voltage balance at each coil in the four sequentially connected coils shown in FIG. 4 is as follows. With an arrangement wherein the one and a half reciprocal winding configuration is applied for each of U1', U2', V1', and V2', making up the four sequentially connected coils, and with the total voltage applied as 100%, the balance voltage $\Delta V1$ of the first coil in the case of $\alpha=4$ is approximately 60%, while the balance voltage $\Delta V2$ of the second coil is approximately 30%. In the event that surge voltage of 1300 V or greater is applied to the four sequentially connected coils, and the voltage balance for one coil is 60%, this means that approximately 800 V is applied to both ends of the coil. The insulating properties of the enamel covering on the coil is capable of withstanding application of 800 V being applied to both ends of the coil without exhibiting insulation destruction.

Conversely, with an arrangement wherein the one and a half reciprocal winding configuration is applied for U1' and V1' at the lead side of the of U1', U2', V1', and V2', making up the four sequentially connected coils shown in FIG. 4, and arrayed winding shown in FIG. 19 being applied for the coils U2' and V2' situated at the neutral point N side, and with the total voltage applied as 100%, the balance voltage $\Delta V1$ of coil U1' which is the first coil is approximately 41%, while the balance voltage $\Delta V2$ of U2' which is the second coil is approximately 57%. As described above, each coil uses an insulation covering which is capable of withstanding application of 60% of 1300 V without exhibiting insulation destruction, so with a case wherein the balance voltage $\Delta V1$ is approximately 41% and the balance voltage $\Delta V2$ is approximately 57%, insulation destruction occurs at neither the first coil nor the second coil. Also, the voltage applied to the third coil and the fourth coil is the remaining 2% of the voltage, and of course there is no insulation destruction.

As described above, an arrangement wherein, of the 24 stator coils shown in FIG. 3, half, i.e., 12, have the one and a half reciprocal winding configuration with cross portions to improve the insulation destruction properties at the lead side, and the other half are of the arrayed winding configuration without crossing, allows the coil end length to be reduced, while maintaining insulation resistivity as well. Incidentally, the external diameter of the stator in this arrangement wherein, of the 24 stator coils half, i.e., 12, have the one and a half reciprocal winding configuration with cross portions to improve the insulation destruction properties at the lead side, and the other half are of the arrayed winding configuration without crossing, and the coil end portions are bent in the outer diameter direction, is 214 mm, and accordingly the stator can be inserted within the housing.

Next, the winding method of the stator coil for the rotating electrical machine according to the present embodiment will be described with reference to FIGS. 20A through 20C.

With the present embodiment, the winding of the first stator coil of the two serially-connected coils is divided into three winding groups, following which a predetermined number of turns are sequentially wound on a spool VL, using an automatic winder (three divided windings equal one and a half reciprocal winding). That is to say, in the event that the number of winds of a stator coil is 12T, different winding methods are used between the first winding group of 1T through 4T, the second winding group of 5T through 8T, and the third winding group of 9T through 12T.

That is to say, first, as shown in FIG. 20A, a conducting wire VL covered with insulation such as an enamel film or the like is wound sequentially in the same direction (R direction) for four winds onto a spool VF, using an automatic winder. At this time, the conducting wire VL is sequentially wound leaving a gap 2P between adjacent winds, P being the diameter of the conducting wire VL. That is to say, 1T through 4T are wound with the winding pitch at 3P, as shown in FIG. 14.

Upon 4T being wound, the winding turns back at 4T, and 5T through 8T of the second group are wound in the gaps formed between 1T through 4T and adjacent to the wires of 1T through 4T, in the same winding direction, as shown in FIG. 20B.

Further, upon 8T being wound leaving a gap of one wire, the winding turns back at 8T, and 9T through 12T are wound in the gaps formed between 1T through 4T and 5T through 8T, in the same winding direction, as shown in FIG. 20C.

Consequently, as shown in FIG. 14, the coil is arrayed in a single layer in the order of 1T, 8T, 9T, 2T, 7T and so on to 4T, 5T, and 12T.

Further, in the event that there is a second spool VF2 and the first stator coil and the second stator coil are to be serially connected (a case wherein a serial connection is to be made such as with the stator coil U1 and the stator coil U2 shown in FIG. 3), the second stator coil is then wound on the second spool VF2 using arrayed winding wherein the 12 winds are all adjacent, as shown in FIG. 19.

Accordingly, by winding the first coil of the two serially-connected coils with reciprocal winding of one and a half windings, and winding the second coil with arrayed winding, the insulation of each of the coils is improved, the length of the coil end portion can be reduced, and further, winding of the two serially-connected stator coils can be easily performed by winding the second coil using a second spool following winding the first coil.

Sixth Embodiment

Next, the configuration of the rotating electrical machine according to a sixth embodiment of the present invention will be described with reference to FIGS. 21A and 21B. The overall configuration of the rotating electrical machine according to the sixth embodiment is the same as that shown in FIGS. 1 and 2, and the connection diagram of the stator coils in the rotating electrical machine according to the present embodiment is the same as with FIG. 3. FIGS. 21A and 21B are explanatory diagrams of the winding method for winding the stator coil in the rotating electrical machine according to the sixth embodiment of the present invention.

With the present embodiment, winding the first coil of the two serially-connected coils with reciprocal winding of one winding, and winding the second coil with arrayed winding, enables the insulation of each of the coils to be improved, while reducing the length of the coil end portion.

That is, as shown in FIGS. 21A and 21B, the winding of the first stator coil of two serially-connected coils is divided into two winding groups, and sequentially wound on a spool VL using an automatic winder (one reciprocal winding). That is to say, in the event that the number of winds of a stator coil is 12T, different winding methods are used between the first winding group of 1T through 6T, and the second winding group of 7T through 12T.

That is to say, first, as shown in FIG. 21A, a conducting wire VL covered with insulation such as an enamel film or the like is wound sequentially in the same direction (R direction) for six winds onto a spool VF, using an automatic winder. At this time, the conducting wire VL is sequentially wound leaving a gap 1P, which is the diameter of the conducting wire VL, between adjacent winds. That is to say, 1T through 6T are wound with the winding pitch at 2P, as shown in FIG. 9.

Upon 6T being wound, the winding turns back at 6T, and the remaining 7T through 12T of the second group are wound in the gaps formed between 1T through 6T, in the same winding direction, as shown in FIG. 21B.

Further, in the event that there is a second spool VF2 and the first stator coil and the second stator coil are to be serially connected (a case wherein a serial connection is to be made such as with the stator coil U1 and the stator coil U2 shown in FIG. 3), the second stator coil is consecutively wound on the second spool VF2 via a crossover line, using arrayed winding wherein the 12 winds are all adjacent, as shown in FIG. 19.

The voltage balance will be described regarding such an arrangement of winding the first stator coil of the two serially-connected coils with reciprocal winding of one winding, and winding the second coil with arrayed winding. In an arrangement wherein the one reciprocal winding configuration is applied for the coils U1' and V1' at the lead side of the of U1', U2', V1', and V2', making up the four sequentially connected coils shown in FIG. 4, and arrayed winding shown in FIG. 19 being applied for the coils U2' and V2' situated at the neutral point N side, and with the total voltage applied as 100%, the balance voltage $\Delta V1$ of coil U1' which is the first coil is approximately 48%, while the balance voltage $\Delta V2$ of coil U2' which is the second coil is approximately 53%. As described above, each coil uses an insulation covering which is capable of withstanding application of 60% of 1300 V without exhibiting the insulation destruction described above, so with a case wherein the balance voltage $\Delta V1$ is approximately 48% and the balance voltage ΔV2 is approximately 53%, insulation destruction occurs at neither the first coil nor the second coil. Moreover, the absolute value of voltage balance between the first coil and second coil is smaller than the arrangement of winding the first stator coil of the two serially-connected coils with reciprocal winding of one and a half windings, and winding the second coil with arrayed winding, shown in FIGS. 20A through 20C. Accordingly, in the event that the voltage applied to the entire four serially connected coil arrangement is great, the present embodiment has greater insulation resistivity as compared to the example shown in FIGS. 20A through 20C, since the voltage balance of the coils can be reduced. Also, winding the coil with reciprocal winding of one winding results in fewer crossed portions than winding the coil with reciprocal winding of one and a half windings, so the coil end portion can be made shorter.

Thus, winding the first stator coil of the two serially-connected coils with reciprocal winding of one winding, and winding the second coil with arrayed winding, enables the insulation of each of the coils to be improved, while reducing the length of the coil end portion.

Now, while the above description has been made regarding an example of the stator coils of each phase being arranged so that two are connected serially, three or more may be connected serially as well. In the case of connecting three coils serially, the first coil at the lead side is wound with reciprocal winding of one and an half windings, or reciprocal winding of one winding. The third coil at the neutral point side is wound with arrayed winding. The second coil between these is either wound with reciprocal winding of one and an half windings or reciprocal winding of one winding, or is wound with arrayed winding. In the event that improved insulation resistivity is desired, winding of one and an half windings or reciprocal winding of one winding is employed, while in the event that reduced length of the coil end portion is desired, arrayed winding is employed.

Seventh Embodiment

A seventh embodiment of the present invention will be described with reference to FIGS. 22 through 26. Components which are the same as those in the preceding embodiments will be denoted with the same reference numerals, and description thereof will be omitted.

Figure 26:
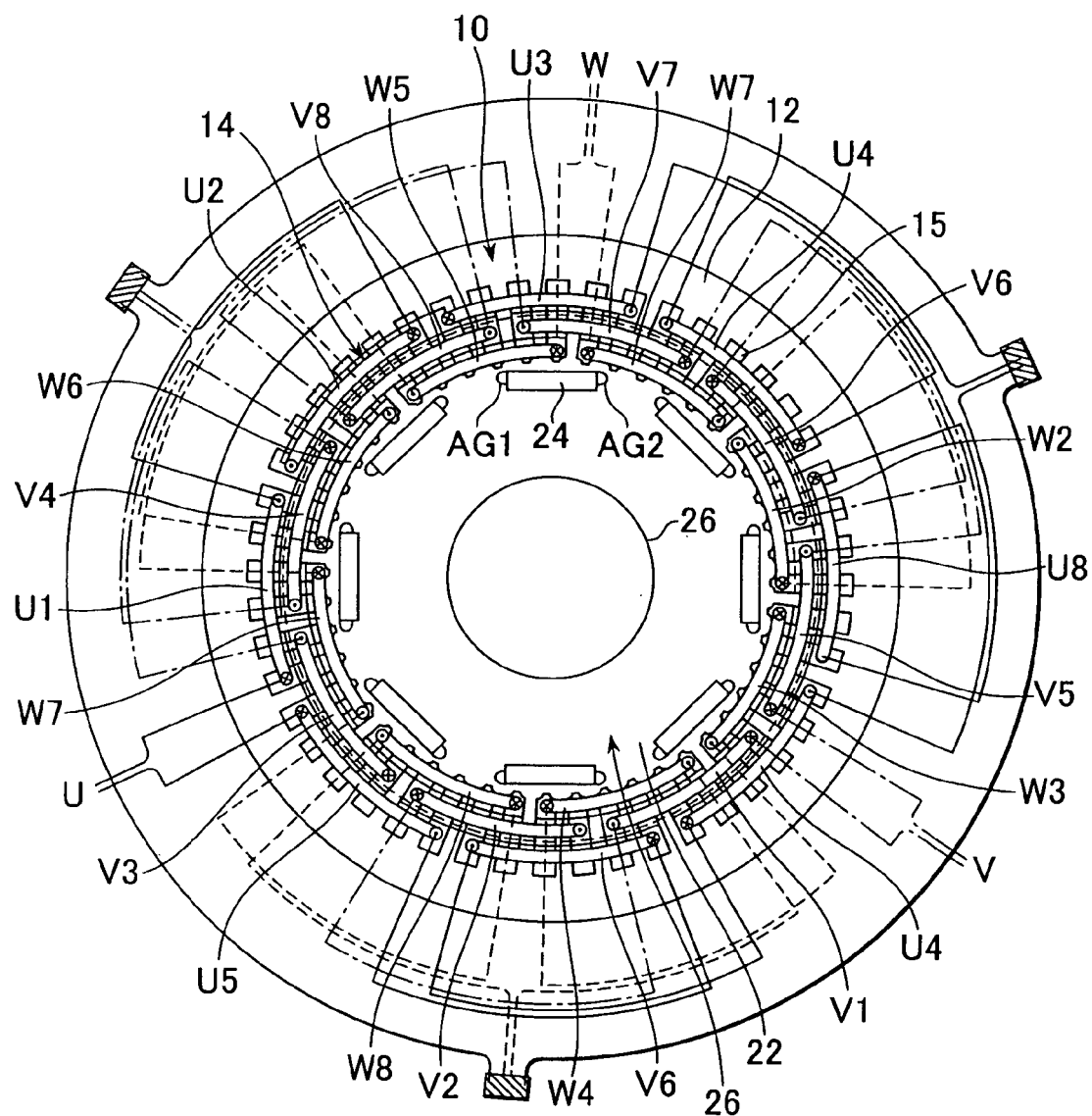
FIG. 26 is a cross-sectional diagram illustrating the overall configuration of a rotating electrical machine which is the seventh embodiment of the present invention.

With the present embodiment, as shown in FIG. 26, 24 stator coils U1, U2, and on up to U8, V1, V2, and on up to V8, and W1, W2, and on up to W8, are connected in a connection ring for each phase. In the drawing, the solid line represents the U-phase connection ring, the one-dot broken line represents the V-phase connection ring, and the dotted line represents the W-phase connection ring. Thus, a Y-connection is realized of the U-phase, V-phase, and W-phase coils. The connection ring is configured of a bus bar formed of a thin plate conductor, and supplies the three-phase AC from the inverter device to the coils of each phase. Note that the connection ring may be used to form a delta connection instead of a Y connection.

The stator coil 14 according to the present embodiment is configured from a Y-connection circuit (star connection circuit) formed by connecting the neutral point side of stator coils of the three phases, i.e., U-phase stator coils (U-phase coil circuits) U, V-phase stator coils (V-phase coil circuits) V, and W-phase stator coils (W-phase coil circuits) W. The stator coil (coil circuit) of each phase is configured by serially arraying four phase coils (or unit coils) formed of multiple winds of a coil conductor so as to form a serial circuit, and connecting two of such serial circuits in parallel. With the U-phase stator coil (U-phase coil circuit), phase coils (unit coils) U1 through U4 are serially connected to configured one serial circuit, phase coils (unit coils) U5 through U8 are serially connected to configured another serial circuit, and these are connected in parallel. The V-phase and W-phase stator coils (coil circuits) are the same, with phase coils (unit coils) V1 through V4 serially connected to configured one serial circuit and phase coils (unit coils) V5 through V8 serially connected to configured another serial circuit being connected in parallel, and phase coils (unit coils) W1 through W4 serially connected to configured one serial circuit and phase coils (unit coils) W5 through W8 serially connected to configured another serial circuit being connected in parallel. With the present embodiment, the stator coil (coil circuit) of each phase is configured such that the number of phase coils making up one serial circuit is greater than the number of serial circuits making up one coil circuit.

Next, the manufacturing method of the stator coil according to the present embodiment will be described with reference to FIGS. 23A through FIG. 25.

Figure 23A:
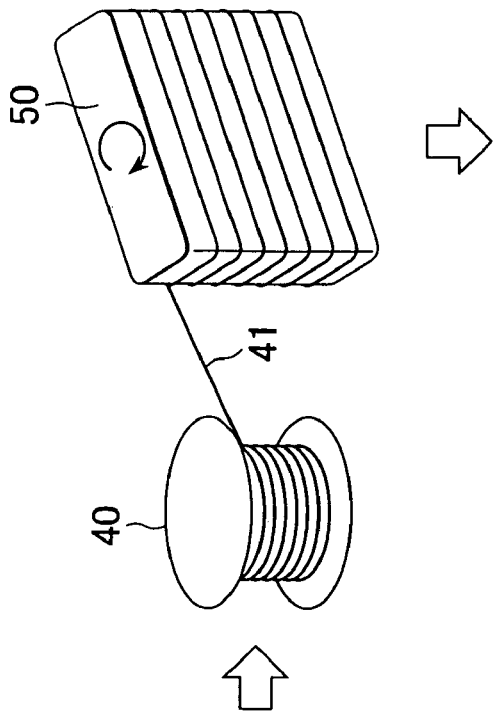
FIGS. 23A through 23D are diagrams for describing the manufacturing method for the phase coils making up the stator coil shown in FIG. 22.
Figure 23B:
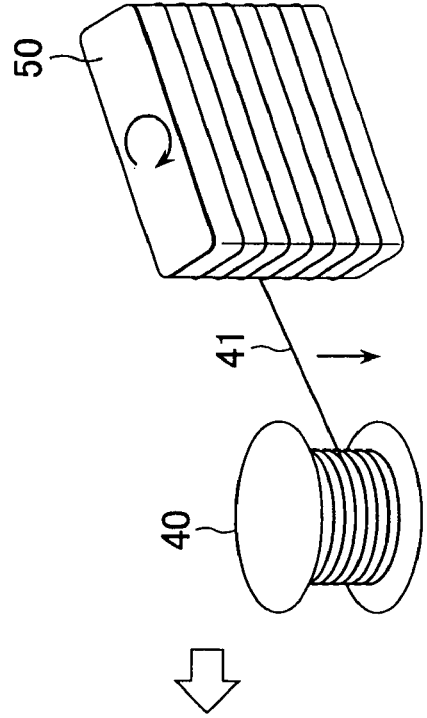

A phase coil (unit coil) is made in the order indicated by the outline arrows. First, an enamel electrical wire 41 (coil conductor) extended from a bobbin 40 is wound multiple turns onto a spool 50, from one side of the spool 50 (the lower direction in the drawing) toward the other side (upper direction in the drawing), in one direction, i.e., upwards in the drawings (FIGS. 23A and 23B). At this time, a gap 42 which is equal to or greater than the diameter of the enamel electrical wire 41 is left between each turn. The return winding is wound in this gap 42.

Figure 23D:
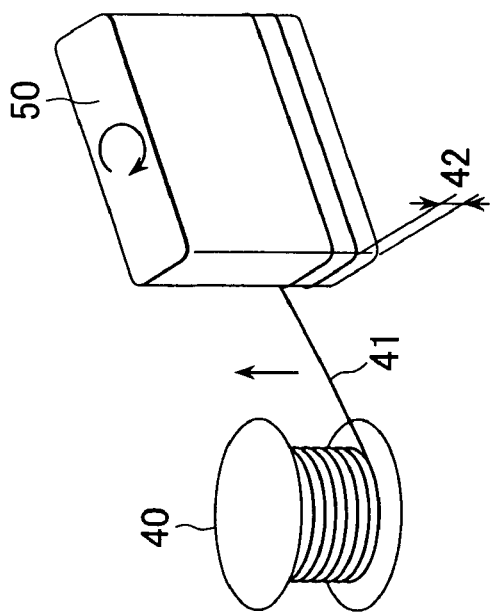
Figure 23C:
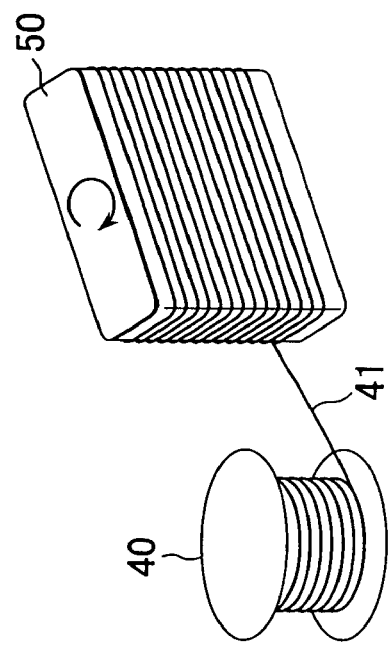

As shown in FIG. 23B, upon completing winding of a predetermined number of turns in one direction, the winding is turned back in the other direction, and the enamel electrical wire 41 is wound the predetermined number of turns from the other side of the spool 50 (the upper direction in the drawing) toward the one side (lower direction in the drawing), so as to return to the winding start position (FIGS. 23C and 23D). The enamel electrical wire 41 returning is wound so as to be situated in the gap 42 between the winds of the enamel electrical wire 41 is wound going.

Now, in the event that the number of turns of the enamel electrical wire 41 (coil conductor) is an odd number, and in the event that the enamel electrical wire 41 is to be wound with one reciprocal winding, the enamel electrical wire 41 should be wound in one direction for a number of turns obtained by (total number of turns minus 1)/2 or (total number of turns plus 1)/2, and then turn back.

Figure 24:
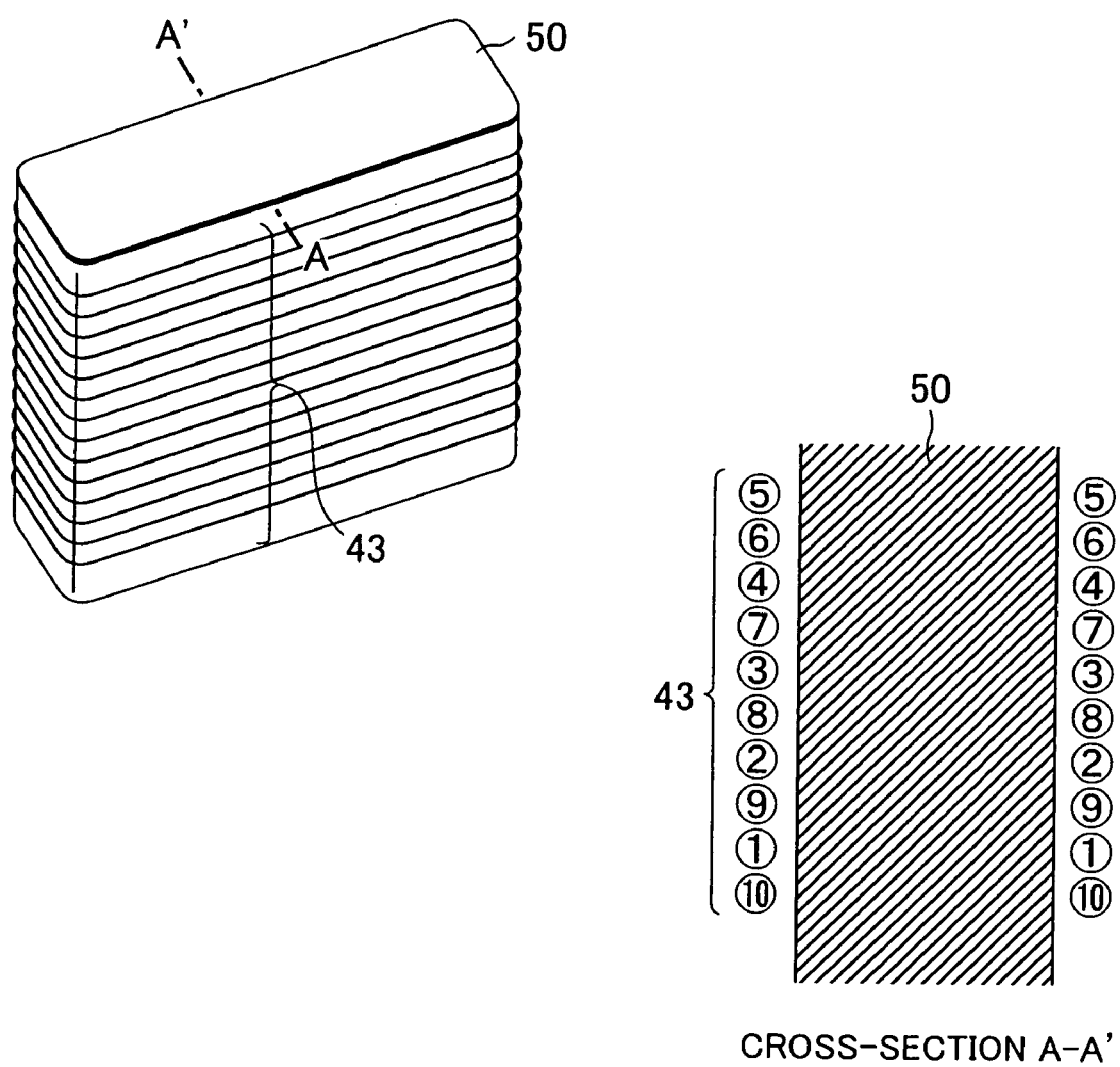
FIG. 24 is a cross-sectional diagram illustrating the placement configuration of a coil conductor group wound on a spool by the manufacturing method shown in FIG. 23.

As shown in FIG. 23D, once the enamel electrical wire 41 (coil conductor) has been reciprocally wound on the spool 50 for the predetermined number of turns, out and back one time, the arrangement of the enamel electric wire group 43 (coil conductor group) on the spool 50 is as shown in FIG. 24. That is to say, in the event that the number of turns in one direction of the enamel electrical wire 41 (coil conductor) is five (i.e., the total number of turns when wound reciprocally is 10), the arrangement of the enamel electrical wire group 43 (coil conductor group) is, from the winding start on the spool 50, in the order of 10T, 1T, 9T, 2T, and so on through 7T, 4T, 6T, and 5T.

Figure 25:
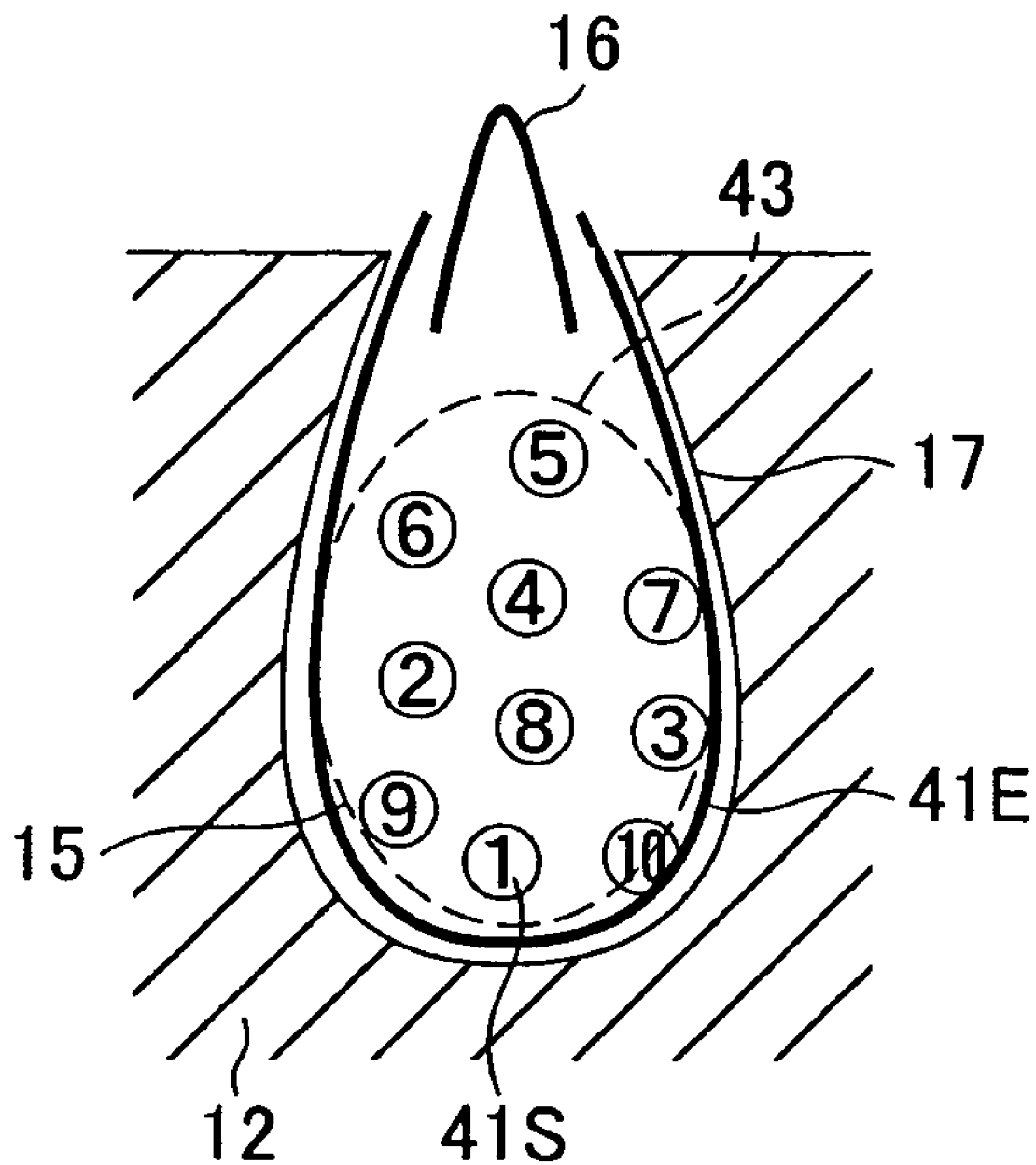
FIG. 25 is a cross-sectional diagram illustrating the placement configuration of the coil conductor group shown in FIG. 24 within a slot.

Thus, the enamel electric wire group 43 (coil conductor group) wound on the spool 50 is inserted into the slot 15 from the opening thereof, in order from the winding start side of the spool 50, i.e., 10T of the enamel electrical wire 41 (coil conductor), and is stored in the slot 15 as shown in FIG. 25. At this time, the placement of the enamel electric wire group 43 (coil conductor group) in the slot 15 is in a state close to the placement order shown in FIG. 3, with the winding-start enamel electrical wire 41S (coil conductor) and the winding-end enamel electrical wire 41E (coil conductor) being at extremely close positions. In the present embodiment, with the diameter of the enamel electrical wire 41 (coil conductor) as R, the distance between the winding-start enamel electrical wire 41S (coil conductor) and the winding-end enamel electrical wire 41E (coil conductor) is within 2R.

A slot insulator 17 is placed on the inner surface of the slot 15 of the stator core 12, upon which the enamel electric wire group 43 (coil conductor group) is stored. Also, a wedge 16 is positioned above the enamel electric wire group 43 (coil conductor group)m i.e., at the opening of the slot 15, in order to prevent the enamel electric wire 41 (coil conductor) from falling out.

According to the present embodiment, control of the placement of the conductor within the slot, which has been difficult with low-voltage rotating electrical machines, can be realized, and the winding-start enamel electrical wire 41S (coil conductor) and the winding-end enamel electrical wire 41E (coil conductor) can be placed in extremely close proximity, so the capacity coupling of the enamel electrical wire 41 (coil conductor) can be increased over conventional arrangements. According, with the present embodiment, the voltage balance between turns of the enamel electrical wire 41 (coil conductor) can be reduced with regard to steep surge voltage from the inverter device. Accordingly, with the present embodiment, concentration of voltage to the line side (opposite from the neutral point side) phase coil (unit coil) with regard to steep surge voltage from the inverter device can be reduced, and anti-surge voltage properties of the rotating electrical machine can be improved.

Also, according to the present invention, the number of phase coils (or unit coils) making up the serial circuits for each phase is four, which is greater than the number of serial circuits (two) making up the coil circuit of each phase, so the reduced balance voltage of the line-side coil (or unit coil) due to stronger capacity coupling between turns of the enamel electric wire 41 (coil conductor) is balanced out among the other phase coils (or unit coils), such that the voltage balance of each of the phase coils (or unit coils) can be made more equal. Accordingly, with the present embodiment, voltage occurring at the contact portion between coil ends of phase coils (or unit coils) of the same phase can be reduced. Accordingly, with the present embodiment, anti-surge properties of the rotating electrical machine can be improved even without introducing insulating sheets between the coil end portions of the phase coils (or unit coils) of the same phase.

Note that the coil end portions of phase coils (or unit coils) is a part which protrudes externally from both ends in the axial direction of the stator core 12 (slot 15), so as to be placed in the space at both end faces in the axial direction of the stator core 12, and is a part for connecting the coil side portions of two phase coils (or unit coils) disposed within slots 15.

With the present embodiment as shown in FIG. 26, for each phase, multiple phase coils (or unit coils) making up one side of a serial circuit are disposed continuously in one circumferential direction (clockwise direction) of the stator core 12 from the lead side (side opposite to the neutral point side) of the coil circuit, and multiple phase coils (or unit coils) making up the other side of the serial circuit are disposed continuously in the other circumferential direction (counter-clockwise direction) of the stator core 12 from the lead side (side opposite to the neutral point side) of the coil circuit, with adjacent ones being in contact one with another. For example, with the U-phase, the phase coils of U1 through U4 are disposed continuously in one circumferential direction (clockwise direction) of the stator core 12 from the lead side of the U-phase, and the phase coils of U5 through U8 are disposed continuously in the other circumferential direction (counter-clockwise direction) of the stator core 12 from the lead side of the U-phase, with adjacent ones being in contact one with another.

Also, with the present embodiment, multiple phase coils (or unit coils) making up each of the serial circuits are serially connected in order according to the placement order of the coil ends. For example, one of the U-phase serial circuits for example has the phase coils (or unit coils) U1 through U4 positioned in the one circumferential direction (clockwise direction) of the stator core 12, so the order of serial connection of the phase coils (or unit coils) U1 through U4 is also in the order of the phase coils (or unit coils) U1 through U4. the other U-phase serial circuit, and the V-phase serial circuits and the W-phase serial circuits are also of the same connection configuration.

Next, the results of comparing properties between the stator coil according to the present invention and a stator coil according to a comparative example will be described with reference to FIGS. 27A through 28B.

First, the configuration of the stator coil according to the comparative example will be described with reference to FIGS. 30A through 32. The connection circuit of the stator coil according of the comparative example is the same as the connection circuit of the stator coil shown in FIG. 22.

Figure 30B:
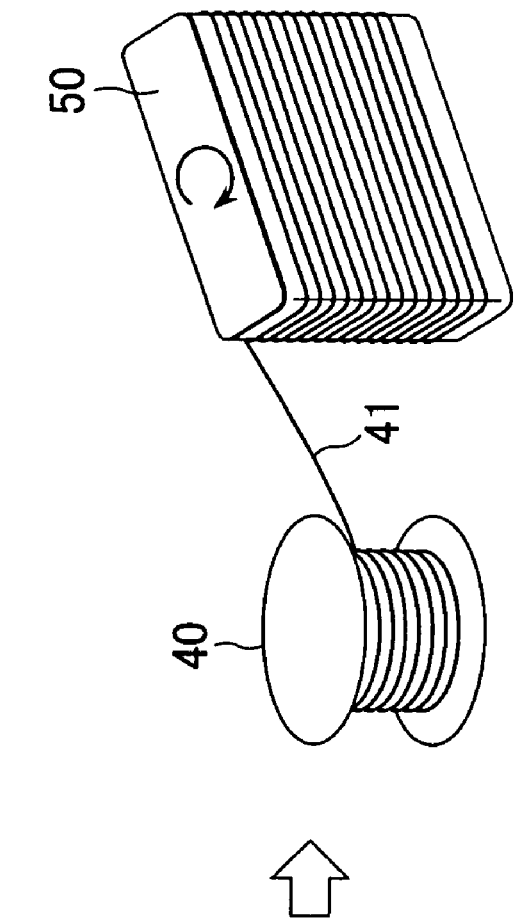
FIGS. 30A and 30B are diagrams for describing the manufacturing method of the phase coils making up the stator coil according to the comparative example.
Figure 30A:
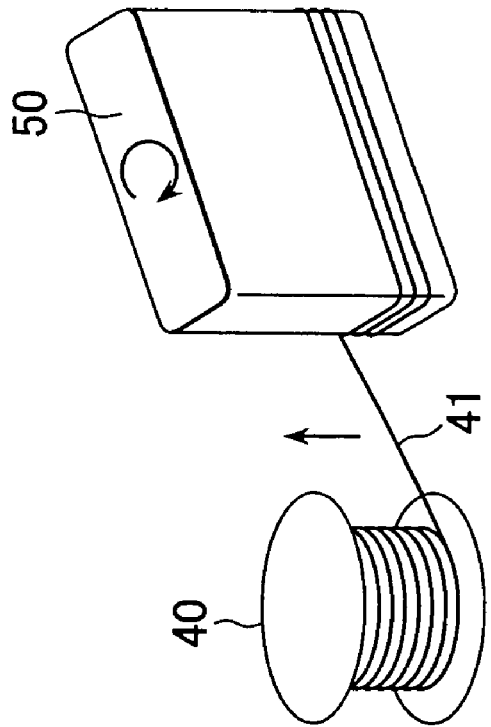
Figure 31:
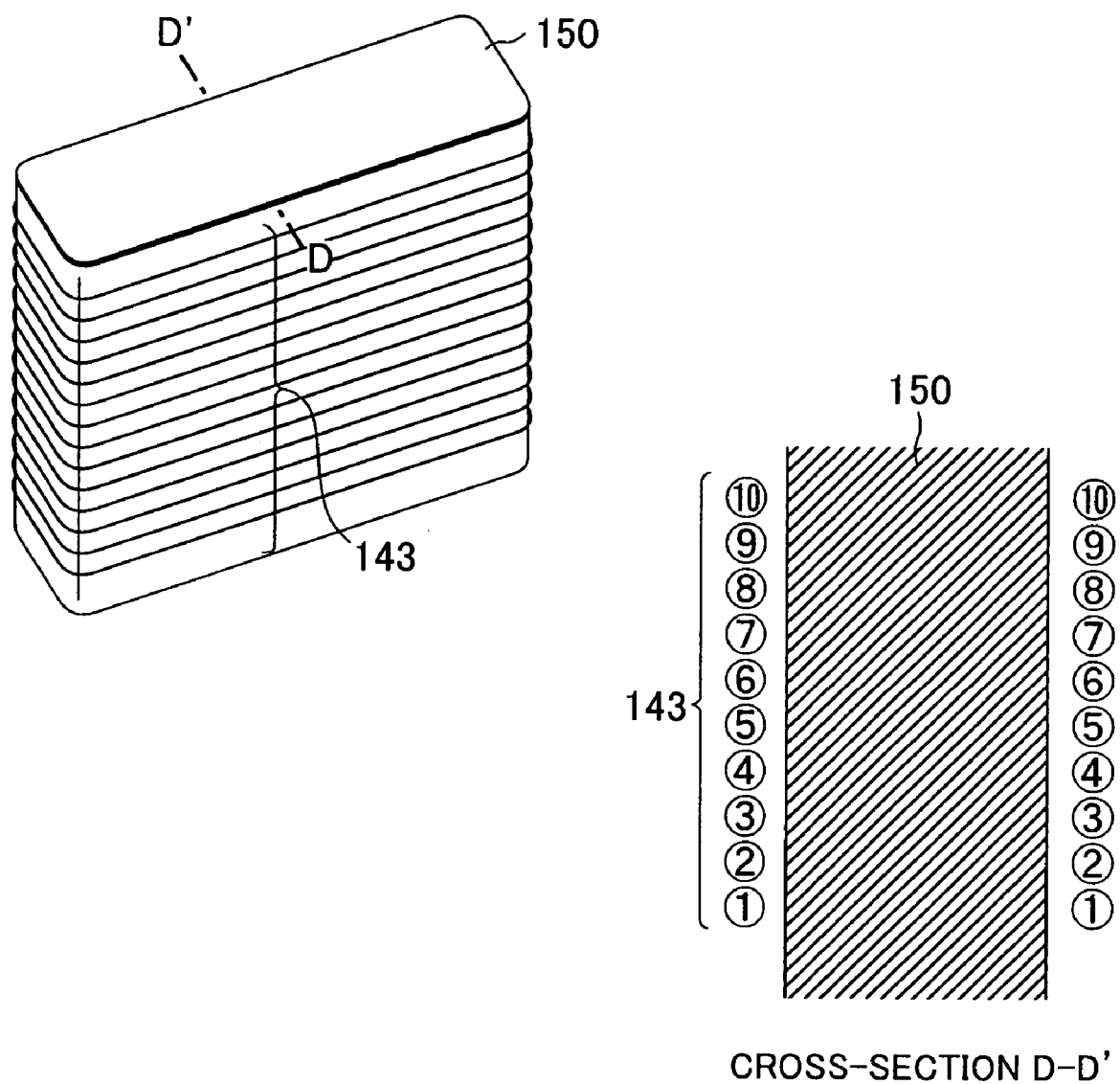
FIG. 31 is a cross-sectional diagram illustrating a placement configuration of the coil conductor group wound on a spool according to the manufacturing method shown in FIGS. 30A and 30B.
Figure 32:
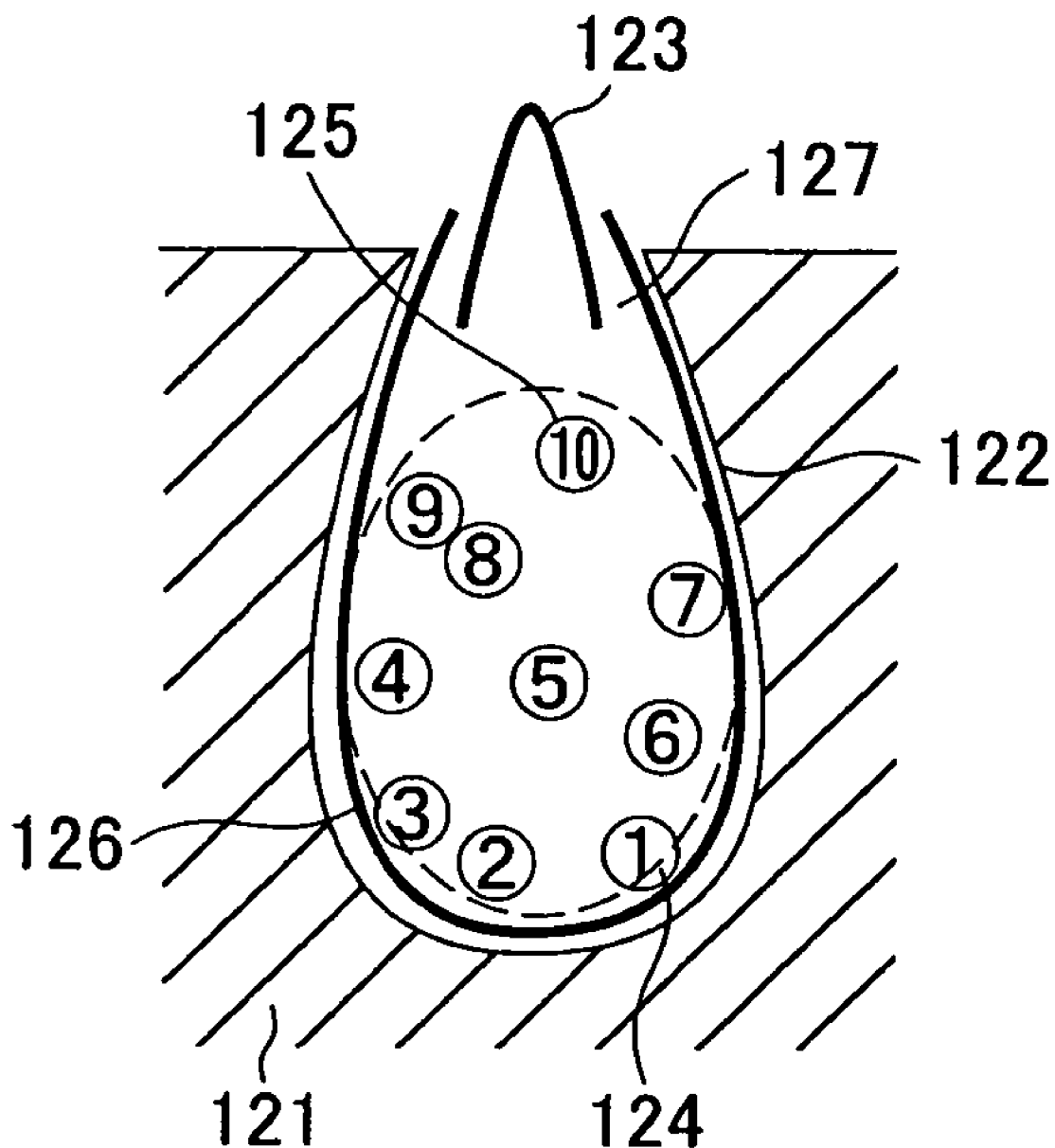
FIG. 32 is a cross-sectional diagram illustrating a placement configuration of the coil conductor group shown in FIG. 31 within a slot.

As shown in FIGS. 30A and 30B, the comparative example is manufactured by winding multiple turns onto a spool 150 by a single winding process in one direction, i.e., from one end side of the spool (the lower side in the drawing) toward the other side thereof (the upper side in the drawing), i.e., upwards in the drawing (FIGS. 30A and 30B). Accordingly, in this comparative example, the array of the enamel electric wire group 143 (coil conductor group) on the spool 150 is, as shown in FIG. 31, in the order to 1T, 2T, 3T, and so on through 8T, 9T, and 10T. Also, with the comparative example, the enamel electric wire group 143 (coil conductor group) is inserted into the slot 15 from the opening thereof from the winding start side of the enamel electric wire group 143 (coil conductor group), i.e., the first turn thereof, and is stored in the slot 115 as shown in FIG. 32. At this time, the array of the enamel electric wire group 143 (coil conductor group) in the slot 115 is close to the array order shown in FIG. 31, with the winding start enamel electric wire 141S (coil conductor) and the winding end enamel electric wire 141E (coil conductor) being situated far away from each other.

Figure 27A:
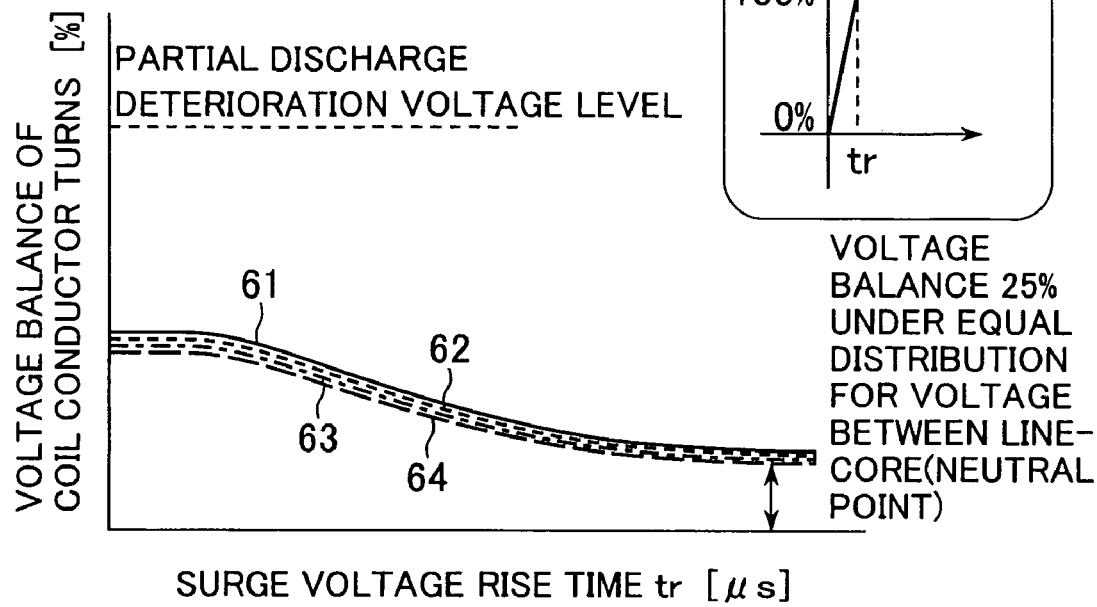
FIG. 27A is a property diagram illustrating voltage balance properties between coil conductor turns with regard to surge voltage rising time for the stator coil according to the seventh embodiment.
Figure 27B:
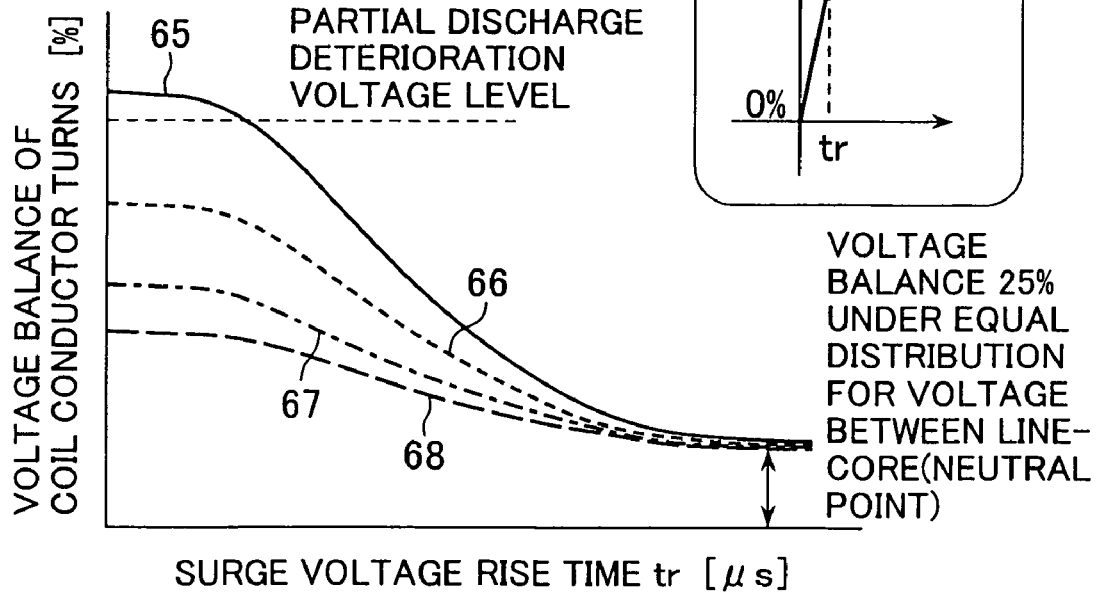
FIG. 27B is a property diagram illustrating voltage balance properties between coil conductor turns with regard to surge voltage rising time for the stator coil according to a comparative example.

FIGS. 27A and 27B are properties diagrams illustrating balance voltage between coil conductor turns with regard to the surge voltage rising time, wherein FIG. 27A illustrates the properties of the stator coil according to the present embodiment, and 27B illustrates the properties of the stator coil according to the comparative example. The waveform of the surge voltage is as shown to the upper right of the drawings, and the results here are regarding a case wherein the peak voltage of the surge voltage is fixed at 100%, and the rising time tr is variated.

As shown in FIG. 27A, with the stator coil according to the present embodiment, the balance voltage 61 of the first phase coil (unit coil) at the line side, the balance voltage 62 of the second phase coil (unit coil), the balance voltage 63 of the third phase coil (unit coil), and the balance voltage 64 of the fourth phase coil (unit coil), each increase as the rising time of the surge voltage is shortened. However, the balance voltage of insulation between turns of the coil conductor is lower in comparison with the partial discharge deterioration voltage where insulation of the enamel electric wire begins to deteriorate. Accordingly, it can be understood that the stator coil according to the present embodiment is well capable of withstanding surge voltage of the inverter device when driving using an inverter device, even without increasing the thickness of the coil insulation.

Conversely, as shown in FIG. 27B, the balance voltage 65 of the first phase coil (unit coil) at the line side, the balance voltage 66 of the second phase coil (unit coil), the balance voltage 67 of the third phase coil (unit coil), and the balance voltage 68 of the fourth phase coil (unit coil), each increase as the rising time of the surge voltage is shortened. Also, with the stator coil according to the comparative example, the increase of balance voltage of the first phase coil (unit coil) at the line side is particularly great, and when the rising time of the surge voltage is shortened, the balance voltage 65 of the first phase coil (unit coil) exceeds the partial discharge deterioration voltage where insulation of the enamel electric wire begins to deteriorate. Accordingly, it can be understood that reinforcing insulation such as increasing the thickness of the coil insulation is necessary with the stator coil according to the comparative example when driving using an inverter device, and that machine output properties must be changed to withstand surge voltage of the inverter device.

Figure 28A:
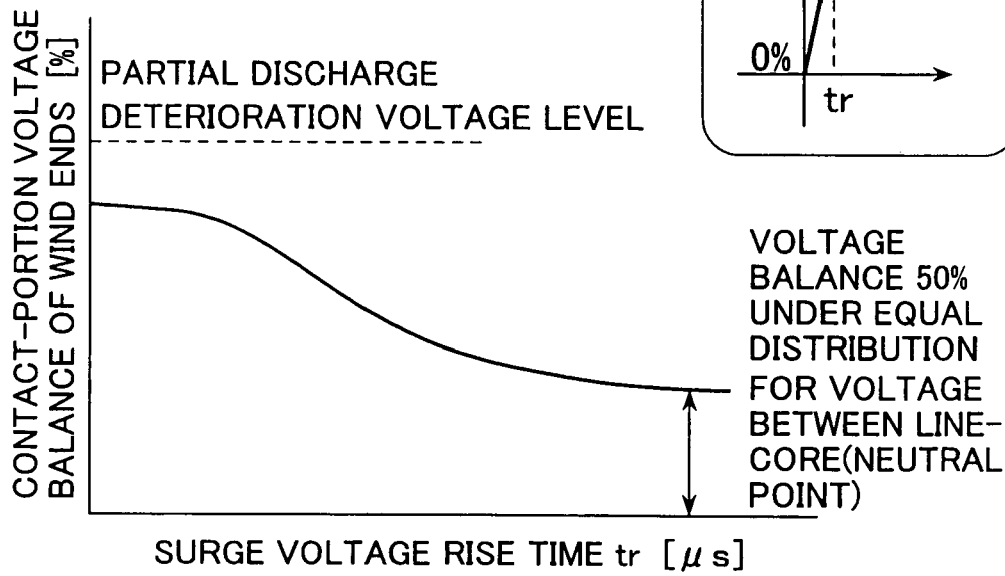
FIG. 28A is a property diagram illustrating voltage balance properties at contact portions between coil ends with regard to surge voltage rising time for the stator coil according to the seventh embodiment.
Figure 28B:
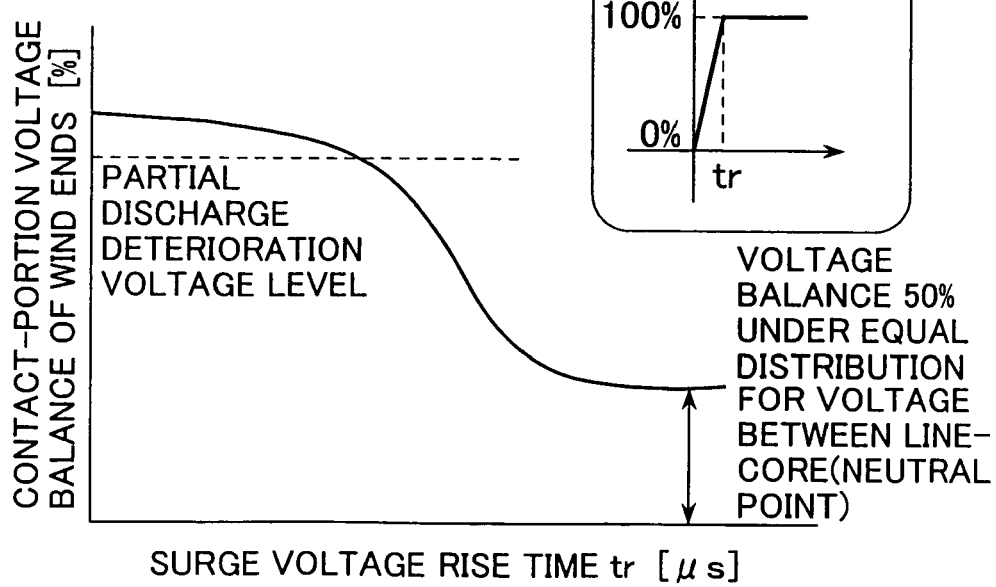
FIG. 28B is a property diagram illustrating voltage balance properties at contact portions between coil ends with regard to surge voltage rising time for the stator coil according to a comparative example.

FIGS. 28A and 28B are properties diagrams illustrating balance voltage at contact portions between coil ends with regard to the surge voltage rising time, wherein FIG. 28A illustrates the properties of the stator coil according to the present embodiment, and 28B illustrates the properties of the stator coil according to the comparative example. The waveform of the surge voltage is as shown to the upper right of the drawings, and the results here are regarding a case wherein the peak voltage of the surge voltage is fixed at 100%, and the rising time tr is variated.

As shown in FIG. 28A, with the stator coil according to the present embodiment, the balance voltage increases as the time tr of the surge voltage rising is shortened. However, with the stator coil according to the present embodiment, the increase of balance voltage as to the surge voltage rising time tr is gradual, and does not greatly increase as to the voltage balance under equal distribution. Accordingly, the balance voltage at contact portions between coil ends does not reach the partial discharge deterioration voltage level. Accordingly, the stator coil according to the present embodiment is well capable of withstanding surge voltage of the inverter device when driving using an inverter device, even without introducing insulating sheets at the contact portions between the coil end portions.

On the other hand, as shown in FIG. 28B, with the stator coil according to the comparative example, the balance voltage at the contact portions between coil end portions increases as the time tr of the surge voltage rising is shortened, and exceeds the partial discharge deterioration voltage level of the enamel electric wire. Accordingly, it can be understood that reinforcing the insulation of the contact portions between the coil end portions by introducing insulating sheets at the contact portions between the coil end portions is necessary with the stator coil according to the comparative example when driving using an inverter device, and that machine output properties must be changed to withstand surge voltage of the inverter device.

Thus, the rotating electrical machine according to the present embodiment has excellent inverter-resistance properties, and also there is no deterioration of machine output properties due to reinforcing insulation, so energy conservation effects due to inverter driving can be obtained without deterioration efficiency, as compared to conventional arrangements.

In the present embodiment, the capacity uniting between turns is strengthened, the allotment voltage of the line side aspect coil is decreased, the decrease of the allotment voltage of this line side aspect coil (pr, unit coil) is allotted to other coils, and the allotment voltage of each aspect coil (or, unit coil) is made equal. In this case, it begins to roll the first coil in edge of the motor winding when the examined number of series coils of the result and one aspect is two in case of other cases, it finishes rolling the conductor (line conductor) and the second coil, and the conductor (neutral point conductor) is contact part in the edge of the winding at the stator core slot exit though it explained this effect as four the number of series coils of one aspect. It was necessary to arrange insulation spacer such as the insulating paper in the contact part between the winding edges. On the other hand, the allotment voltage of the contact part between the winding edges was less than partial electrical discharge deterioration voltage when the number of series coils was assumed to be three or more, and the surge voltage of the inverter device was able to be endured enough without arranging insulation spacer such as the insulating paper in the contact part between the winding edges. Especially, the allotment voltage of the contact part between the winding edges was able to be decreased by increasing the number of series coils.

In the motor shown in FIG. 26 of this present embodiment, it is made to distribute the interference lead of the winding of U, V, and W three-phase circuit and the neutral point connection lead in the direction of surroundings uniformly in shifting U, V, and the line side coil position of the winding of W three-phase circuit in the direction of surroundings by 120 degrees and to be arranged, and the motor winding edge size is made to become uniformly. However, the line side coil of the winding of U, V, and W three-phase circuit can be brought close. That is, the line side coil position of U, V, and W can be shifted in the direction of surroundings by 30 degrees for the motor of FIG. 26. In this case, the winding neutral point connection line of lead line from the outside of the motor to U, V, and W line side coil, U, V, and W aspect can be shortened, and the winding resistance can be reduced though the motor winding edge size becomes not uniform. Therefore, it is preferable in the motor that the motor winding edge size need not be uniform to bring U, V, and the line side coil of the winding of W three-phase circuit close.

Eighth Embodiment

Figure 29:
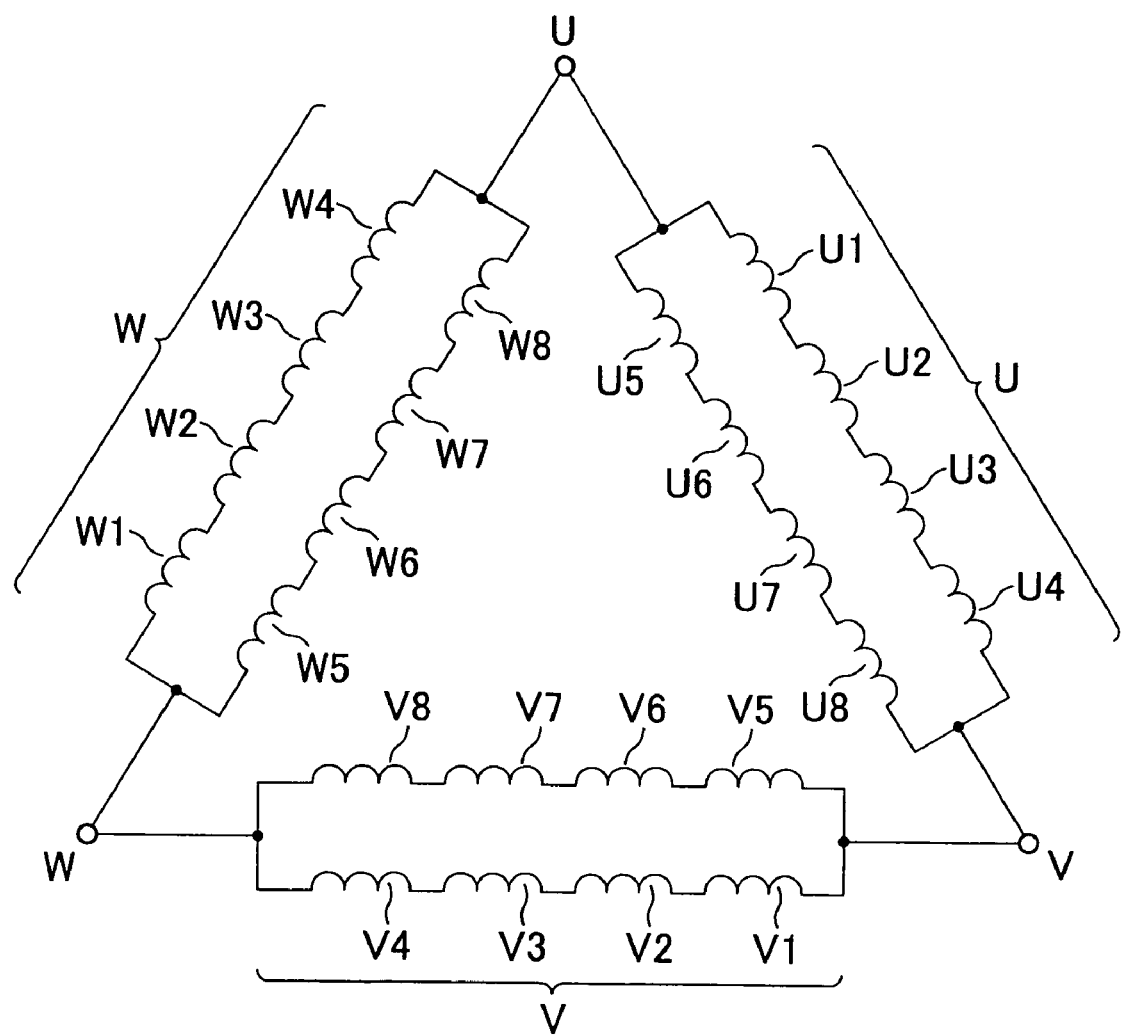
FIG. 29 is a circuit diagram illustrating the connection configuration of a stator coil in a rotating electrical machine which is an eighth embodiment of the 29esent invention.

An eighth embodiment of the present invention will be described with reference to FIG. 29.

Figure 22:
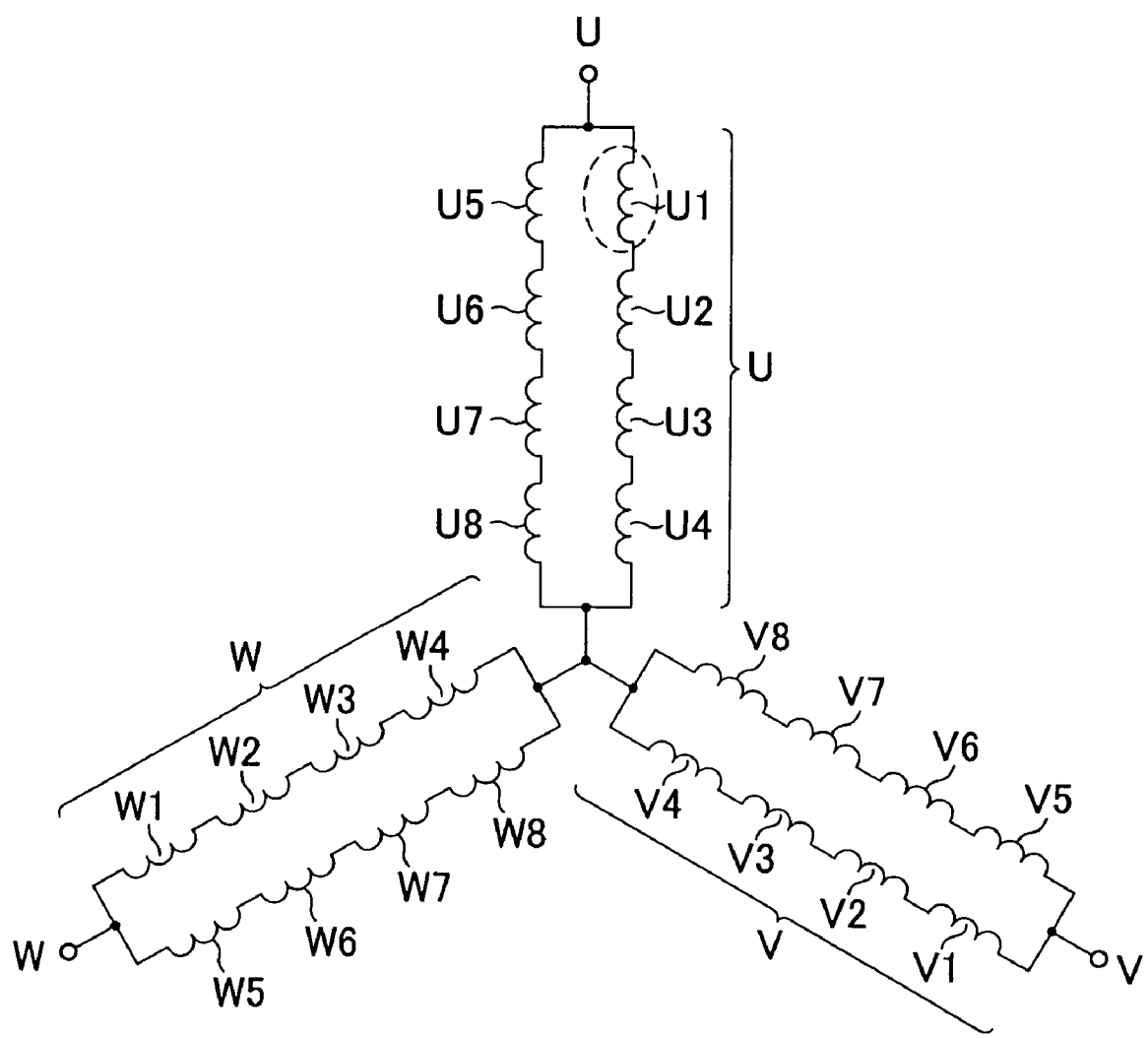
FIG. 22 is a circuit diagram illustrating the connection configuration of the stator coil of the rotating electrical machine according to a seventh embodiment of the present invention.

With the present embodiment, stator coils of three phases, i.e., the U-phase stator coils (U-phase coil circuit) U, V-phase stator coils (V-phase coil circuit) V, and W-phase stator coils (W-phase coil circuit) W, shown in FIG. 22, are connected such that a triangular connection circuit (delta connection circuit) is formed, thereby making up a stator coil. The configuration of each of the coil circuits is the same as in FIG. 22. Also, multiple phase coils (unit coils) are fabricated in the same manner as with the manufacturing method according to the first embodiment, and inserted into the slots of the stator core.

Now, generally, in a case of driving a rotating electrical machine having stator coils in a delta connection with a sine wave, inter-phase voltage between the U-V phases, V-W phases, and W-U phases, is balanced between each of the coil circuits, so the balance value of each of the phase coils (unit coils) making up each of the coil circuits is greater than the case of a rotating electrical machine having stator coils in a Y-connection. However, much study has revealed that the balance voltage at the insulation between turns of the coil conductor when driving the rotating electrical machine using an inverter device is generated with regard to the steep surge voltage applied between the lead electric wire of each phase and the stator core. Accordingly, anti-surge voltage properties of the rotating electrical machine can be improved even in a case of configuring the stator coils in a delta connection, by configuring the phase coils (unit coils) according to the present embodiment.

The above seventh embodiment has been described regarding an arrangement of a stator coil configured of two parallel serial circuits each of four coils in a Y-connection three-phase arrangement, and the eighth embodiment has been described regarding an arrangement of a stator coil configured of two parallel serial circuits each of four coils in a delta-connection three-phase arrangement, as examples. While the advantages of the present embodiment is particularly marked with the two-parallel circuit arrangement described with the first and second embodiments, surge voltage reduction effects can be obtained by employing the stator coil configuration according to the present embodiment even in cases of two-phase arrangements, or in cases of one parallel circuit or four parallel circuits.

What is claimed is:

1. A rotating electrical machine comprising:
a stator wherein each of stator coils for three phases have been wound on salient poles of a stator core by distributed winding; and
a rotor on which a plurality of permanent magnets have been distributed at equal intervals in the circumferential direction, said rotor being supported to as to be rotatable facing said stator;
the stator coils of each phase being formed such that two or more series of at least a plurality of stator coils are connected, wherein
the one of said stator coils situated at the lead wire side is divided into N (wherein N=2, 3, or 4) groups in which the number of winds for each group is equal or approximately equal,
a winding wire for a first group is wound on a spool leaving a gap of ((N−1)·P) with respect to the diameter P of the conducting wire,
upon winding of said first group being complete, the winding is turned back so as to wind the winding wire for a second group in said gap, so as to be adjacent to the winding wire of said first group,
and in the event that N=3 or greater, the winding wire of the next group is further wound in the gap adjacent to the winding wire of the previous groups, and wound on the spool arrayed in a single layer,
wherein one said stator coil positioned at the neutral point side of the three phases of stator coils connected by Y-connection is wound such by arrayed winding so that the winds are sequentially adjacent in the winding direction, and subsequently inserted into a slot of the stator core of said stator, thereby configuring the stator coil.

2. A rotating electrical machine comprising:
a stator wherein each of stator coils for three phases have been wound on salient poles of a stator core by distributed winding; and
a rotor on which a plurality of permanent magnets have been distributed at equal intervals in the circumferential direction, said rotor being supported to as to be rotatable facing said stator;
wherein said stator coils are formed such that
each of said stator coils is divided into N (wherein N=2, 3, or 4) groups in which the number of winds for each group is equal or approximately equal,
a winding wire for a first group is wound on a spool leaving a gap of ((N−1)·P) with respect to the diameter P of the conducting wire,
upon winding of said first group being complete, the winding is turned back so as to wind the winding wire for a second group in said gap, so as to be adjacent to the winding wire of said first group,
in the event that N=3 or greater, the next winding wire of the next group is further wound in the gap adjacent to the winding wire of the previous groups, and wound on the spool arrayed in a single layer, following which the wound wires are inserted within a slot of the stator core of said stator, thereby completing a stator coil.

3. A rotating electrical machine according to claim 2, said stator coil being formed such that
a stator coil is divided into 2 groups in which the number of winds for each group is equal or approximately equal,
a winding wire for the first group is wound on a spool leaving a gap of 1P with respect to the diameter P of the conducting wire,
upon winding of said first group being complete, the winding is turned back so as to wind the winding wire for the second group in said gap, following which
the wound wires are inserted within a slot of the stator core of said stator, thereby completing a stator coil.

4. A rotating electrical machine according to claim 2, said stator coil being formed such that
a stator coil is divided into 3 groups in which the number of winds for each group is equal or approximately equal,
a winding wire for the first group is wound on a spool leaving a gap of 2P with respect to the diameter P of the conducting wire,
upon winding of said first group being complete, the winding is turned back so as to wind the winding wire for the second group in said gap, so as to be adjacent to the winding wire of said first group,
the winding wire of a third group is further wound between the winding wire of the first group and the winding wire of the second group, in the gap between the winding wire of the first group and the winding wire of the second group, and wound on the spool arrayed in a single layer, following which
the wound wires are inserted within a slot of the stator core of said stator, thereby completing a stator coil.

5. A rotating electrical machine according to claim 4, wherein said stator coil is formed of two or more coils connected serially;
and wherein, following winding the winding wire of the first through third groups of said first stator coil on a first spool, a first through a third group of the second stator coil are consecutively wound on a second spool, using the conductor continuing from said third group.

6. A rotating electrical machine according to claim 2, said stator coil being formed such that
a stator coil is divided into 4 groups in which the number of winds for each group is equal or approximately equal,
a winding wire for the first group is wound on a spool leaving a gap of 3P with respect to the diameter P of the conducting wire,
upon winding of said first group being complete, the winding is turned back so as to wind the winding wire for the second group in said gap, so as to be adjacent to the winding wire of said first group,
the winding wire of a third group is further wound in the gap between the winding wire of the first group and the winding wire of the second group, so as to be adjacent to the winding wire of the second group,
the winding wire of a fourth group is further wound in the gap between the winding wire of the first group and the winding wire of the third group, and wound on the spool arrayed in a single layer, following which the wound wires are inserted within a slot of the stator core of said stator, thereby completing a stator coil.

7. A rotating electrical machine according to claim 2, the stator coils of each phase being formed such that two or more series of at least a plurality of stator coils are connected, wherein the one of said stator coils situated at the lead wire side is divided into N (wherein N=2, 3, or 4) groups in which the number of winds for each group is equal or approximately equal, a winding wire for a first group is wound on a spool leaving a gap of ((N−1)·P) with respect to the diameter P of the conducting wire, upon winding of said first group being complete, the winding is turned back so as to wind the winding wire for a second group in said gap, so as to be adjacent to the winding wire of said first group, and in the event that N=3 or greater, the winding wire of the next group is further wound in the gap adjacent to the winding wire of the previous groups, and wound on the spool arrayed in a single layer, wherein one said stator coil positioned at the neutral point side of the three phases of stator coils connected by Y-connection is wound such by arrayed winding so that the winds are sequentially adjacent in the winding direction.

8. A rotating electrical machine comprising:

a stator; and a rotor borne to as to be rotatable facing the circumferential face of said stator across a gap;

said stator having a stator core, and stator coils wound on said stator core by distributed winding, said stator core having a plurality of slots continuous in the axial direction formed in the circumferential direction, and said stator coils being formed such that a stator coil is divided into N (wherein N=2, 3, or 4) groups in which the number of winds for each group is equal or approximately equal, a winding wire for a first group is wound on a spool leaving a gap of ((N−1)·P) with respect to the diameter P of the conducting wire, upon winding of said first group being complete, the winding is turned back so as to wind the winding wire for a second group in said gap, so as to be adjacent to the winding wire of said first group, in the event that N=3 or greater, the winding wire of the next group is further wound in the gap adjacent to the winding wire of the previous groups, and wound on the spool arrayed in a single layer, following which the wound wires are inserted within a slot of the stator core of said stator, thereby completing a stator coil.

9. A rotating electrical machine comprising:

a stator; and a rotor borne to as to be rotatable facing the circumferential face of said stator across a gap;

said stator having a stator core, and stator coils wound on said stator core by distributed winding, said stator core having a plurality of slots continuous in the axial direction formed in the circumferential direction, and said stator coils being formed such that a stator coil is divided into N (wherein N=2, 3, or 4) groups in which the number of winds for each group is equal or approximately equal, each coil is wound on a spool in one arrayed layer such that between winds of one group are winds of another group, following which the wound wires are inserted within a slot of the stator core of said stator, thereby completing a stator coil.

* * * * *